United States Patent
Panchaksharaiah et al.

(10) Patent No.: US 12,519,861 B2
(45) Date of Patent: Jan. 6, 2026

(54) SYSTEMS AND METHODS TO ACCESS PERSONALIZED RECOMMENDATION ON PUBLIC DEVICE WITHOUT LOGGING IN

(71) Applicant: Adeia Guides Inc., San Jose, CA (US)

(72) Inventors: Vishwas Sharadanagar Panchaksharaiah, Karnataka (IN); Gyanveer Singh, Bangalore (IN); Pooja Srivastava, Bengaluru (IN); Shyak Das, West Bengal (IN); Sumit Prasad, Karnataka (IN); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 108 days.

(21) Appl. No.: 18/206,435

(22) Filed: Jun. 6, 2023

(65) Prior Publication Data
US 2024/0414241 A1 Dec. 12, 2024

(51) Int. Cl.
*H04L 67/303* (2022.01)
*H04L 67/141* (2022.01)

(52) U.S. Cl.
CPC .......... *H04L 67/303* (2013.01); *H04L 67/141* (2013.01)

(58) Field of Classification Search
CPC ..... H04L 67/141; H04L 67/303; H04L 47/70; H04L 65/403; H04L 65/1016; H04L 65/1069; H04L 65/1093; H04L 51/10; H04L 51/32; G06F 21/6218; G06F 16/639
USPC ....................................................... 709/219
See application file for complete search history.

(56) References Cited

U.S. PATENT DOCUMENTS

| | | | | |
|---|---|---|---|---|
| 8,918,411 | B1* | 12/2014 | Latif | G06F 16/9535 707/790 |
| 10,498,368 | B2* | 12/2019 | Salomons | H03M 13/353 |
| 12,143,621 | B2* | 11/2024 | Zhao | H04N 19/423 |
| 2012/0079417 | A1* | 3/2012 | Kalu | G06F 16/44 715/814 |
| 2014/0068692 | A1* | 3/2014 | Archibong | H04N 21/4334 725/116 |
| 2015/0095184 | A1* | 4/2015 | Ainsworth | G06Q 30/0631 705/26.7 |
| 2015/0120875 | A1* | 4/2015 | Yao | H04N 21/23116 709/219 |

(Continued)

FOREIGN PATENT DOCUMENTS

WO 2021188173 A1 9/2021

*Primary Examiner* — James N Fiorillo
(74) *Attorney, Agent, or Firm* — HALEY GUILIANO LLP

(57) ABSTRACT

Systems and methods are described for sharing and displaying personalized content and media asset recommendations for an OTT account associated with a guest device on a host/public device without having the guest device logging in via the host device into their own OTT account. Host and guest devices are identified based on their OTT profiles. A process to determine interest in displaying on the host device is determined when the guest device launches an OTT application, is on the same local area network, or is within a predetermined distance of the host device. Sharing and displaying restrictions associated with both guest and host device accounts are considered in issuing a session token, based on which the personalized OTT content associated with the guest device is displayed on the host device. Personalized media asset recommendations commonly shared between the guest and host devices are displayed separately on the host device.

18 Claims, 16 Drawing Sheets

(56) References Cited

U.S. PATENT DOCUMENTS

| | | | |
|---|---|---|---|
| 2016/0094880 A1* | 3/2016 | Ward | G06Q 30/0261 |
| | | | 725/12 |
| 2016/0357355 A1* | 12/2016 | Carrigan | H04L 67/1097 |
| 2017/0048184 A1* | 2/2017 | Lewis | G06Q 30/0631 |
| 2018/0124128 A1* | 5/2018 | Faulkner | H04L 65/1093 |
| 2018/0213284 A1* | 7/2018 | Shekhar | H04N 21/4532 |
| 2018/0352014 A1* | 12/2018 | Alsina | H04N 21/47217 |
| 2019/0007756 A1* | 1/2019 | Navali | H04L 63/0428 |
| 2019/0045262 A1* | 2/2019 | Hardy | H04N 21/816 |
| 2019/0141399 A1* | 5/2019 | Auxer | H04N 21/4753 |
| 2019/0318108 A1* | 10/2019 | Pokharel | H04L 63/0421 |
| 2020/0015121 A1* | 1/2020 | Misra | H04L 65/752 |
| 2020/0193482 A1* | 6/2020 | Howard | H04M 1/7243 |
| 2020/0221184 A1* | 7/2020 | Skliba | H04N 21/47214 |
| 2020/0278997 A1* | 9/2020 | Lamere | G06F 16/632 |
| 2022/0150592 A1* | 5/2022 | Nishimura | H04N 21/44218 |
| 2022/0239710 A1* | 7/2022 | Gonzalez De Langarica | |
| | | | H04L 65/1086 |
| 2022/0350906 A1* | 11/2022 | Emmanuel | G06F 21/10 |
| 2023/0125723 A1* | 4/2023 | Pearlman | H04N 21/4821 |
| | | | 725/46 |
| 2023/0379521 A1* | 11/2023 | Grover | H04N 21/26241 |
| 2024/0078331 A1* | 3/2024 | Kannan | G06F 21/6218 |
| 2024/0211298 A1* | 6/2024 | Jatti | G06F 9/45558 |
| 2024/0414241 A1* | 12/2024 | Panchaksharaiah | |
| | | | H04N 21/4668 |

* cited by examiner

SYSTEMS AND METHODS TO ACCESS PERSONALIZED RECOMMENDATION ON PUBLIC DEVICE WITHOUT LOGGING IN

FIELD OF INVENTION

Embodiments of the present disclosure relate to accessing an individual's personalized media asset recommendations in an OTT streaming environment on a public device, such as a contact's or friend's display device, without having the individual log in via the public device into their own OTT streaming account.

BACKGROUND

Users like sharing their own over-the-top (OTT) content viewing history with friends to help recommend additional OTT content for the friend to watch. Users also like to link their OTT streaming accounts, such as Netflix™ or Amazon Prime™ accounts, with their social network account (e.g., Facebook) and share what they are watching with their friends. For example, if the user has watched "Game of Thrones" or "Top Gun" movie on their Netflix™ account, they may like to share that with their friends, colleagues, and relatives.

Users also may track each other's consumption history. For example, U.S. Pat. No. 11,316,938 titled "Tracking media content consumed on foreign devices" discloses various approaches for tracking content viewing history and/or consumption progress by a guest subscriber consuming content accessed by a host subscriber.

In a scenario when a guest visits a friend's house, the guest may want to share their viewing history on a TV located in their friend's house. To do so, the guest needs to enter their credentials in the Netflix™ app running on their own device, such as a mobile phone, i.e., log in to their own Netflix™ account using their mobile device. The guest may then cast (e.g., transfer the display of content) or use another method to display the content from their OTT account onto the TV, such as from their mobile device to the TV, or directly from the OTT's playback service to a client device that is capable of playing the content (e.g., Smart TV, Set-top box, streaming media player connected to a display or TV, etc.). In an alternative approach, the guest may log in to their OTT account using the TV, if it's a smart TV, and then have their streaming content that is accessible through their account visible on the friend's screen.

There are several problems with the current methods of sharing. For example, the current sharing process in which the guest logs in to the TV does not protect the guest's privacy. Furthermore, the data shared on the TV may be available to the host even after the guest leaves from the host's location, such as from the host's home where the host device is located.

If the guest chooses to log in to their OTT account, such as Netflix™, on their own device while at the host/friend's house, for example log in to their own mobile phone, and cast from their mobile phone to the TV, the process is cumbersome and requires several steps. Although sharing on a friend's or public/host device is done often, current methods and applications for providing a way for users to share and display while protecting their privacy are often difficult and cumbersome.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
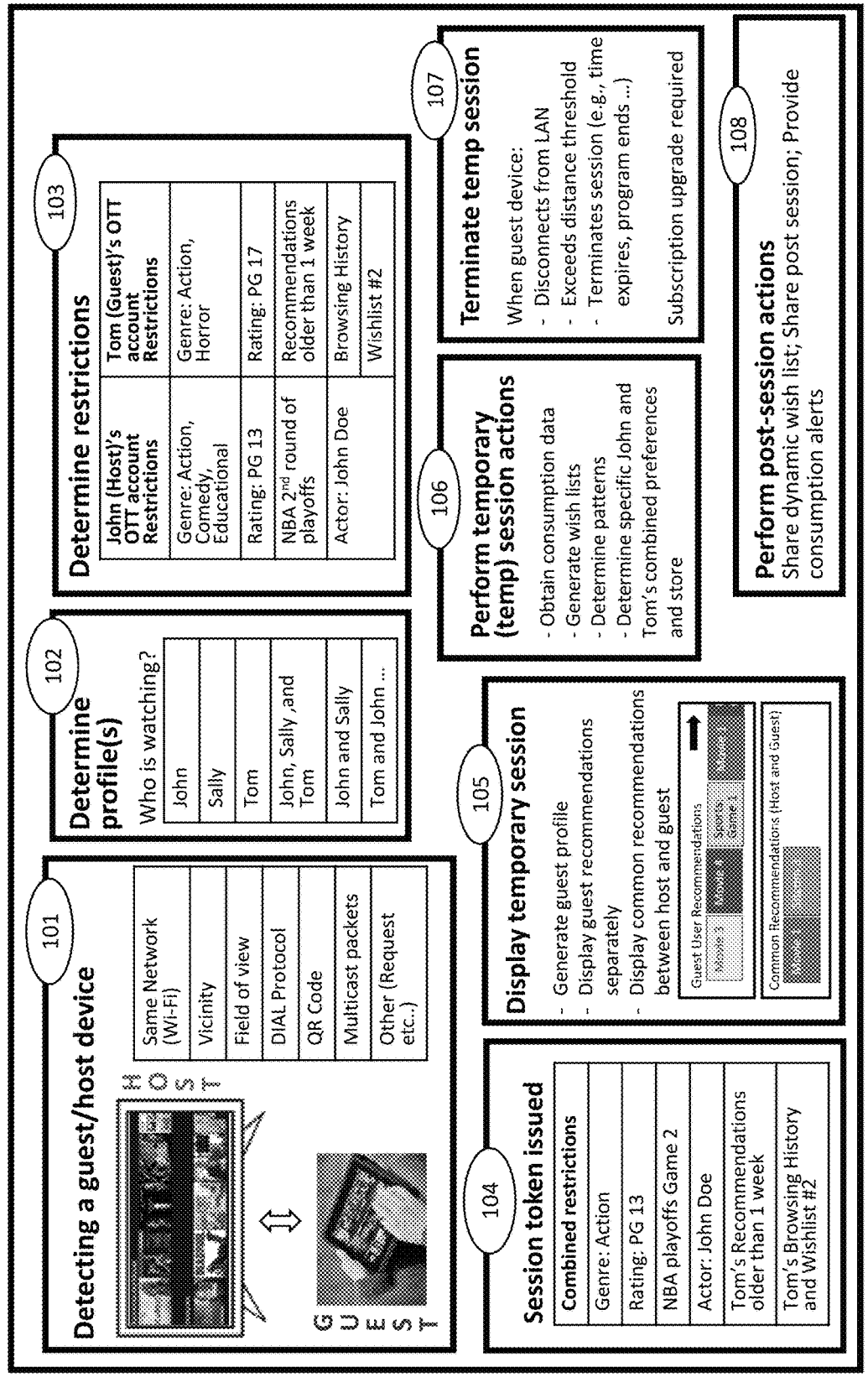
FIG. 1 is a block diagram of an example of a process for sharing recommendations (and other content) for a guest device on a host device without having the guest log in to their OTT account via the host device, in accordance with some embodiments of the disclosure.

In accordance with some embodiments disclosed herein, some of the above-mentioned limitations are overcome by sharing and displaying personalized content and media asset recommendations made for a guest device, or an OTT streaming account associated with the guest device, in an OTT environment on a host or public device without having the guest device log in via the public host device into their own OTT account.

In some embodiments, host and guest devices are identified based on their OTT profiles that are associated with an OTT application, such as a profile associated with a Netflix™ account. A process to determine interest in sharing and displaying on the host device is determined when the guest device launches an OTT application, is on the same local area network as the host device or is within a predetermined distance of the host device. Sharing and display restrictions associated with both guest and host devices, or their associated OTT streaming accounts, are considered and a session token is issued based on the considerations. Based on the issued session token, content associated with the guest device, i.e., with an OTT account associated with the guest device where the content may be stored on an OTT server, is shared, and displayed on the host device. The display of the shared content on the host device, the content being associated with the OTT account linked with the guest device, such as personalized media asset recommendations that are personalized for the guest device (or an OTT streaming account associated with the guest device) based on its consumption history of OTT content from the OTT application, may be displayed in a filmstrip format. The display of the shared content may also be in a horizontal or vertical format, such as tiles of movie icons adjacent to each other. The personalized media asset recommendations commonly shared between the guest and host devices, or their OTT accounts, are displayed separately on the host device, such as in a separate row, with tiles that display an icon of the media asset, in a filmstrip-style format.

The shared content, such as Top Gun™ movie that is a common personalized media asset recommendations for both host and guest device users, or their associated OTT streaming account, may be displayed as highlighted, bolded, colored separately than non-common media asset recommendations. The common personalized media asset recommendations may also be displayed with an icon that is overlayed on the media asset recommendation, such as an icon which indicates that it is a common recommendation, or in another format in lieu of presenting duplicate content items that are common to both.

The description below references various figures. FIGS. 1 and 5-8 depict example methods or processes that may be implemented by systems and devices of FIGS. 2-3. FIGS. 3-5 and 9-16 depict example functions and entities described herein, such as manual or automatic selections that may be on the guest device to share OTT content on the host device or various host and guest device actions that may be performed, etc. Finally, FIGS. 2-3 depict example systems for implementing the disclosed techniques.

Figure 2:
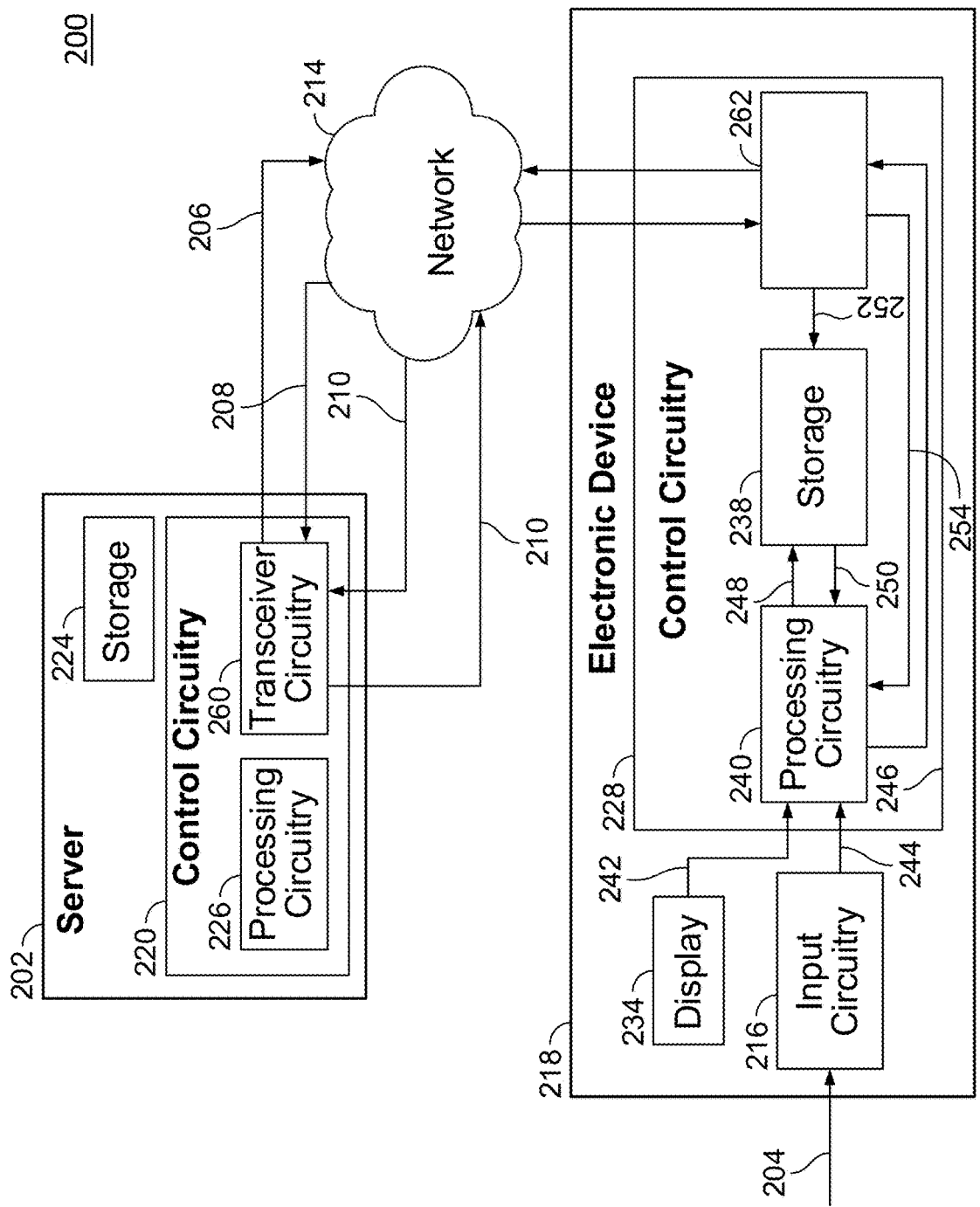
FIG. 2 is a block diagram of an exemplary system for sharing recommendations (and other content) for a guest device on a host device without having the guest device to log in to its OTT account via the host device, in accordance with some embodiments of the disclosure.
Figure 3:
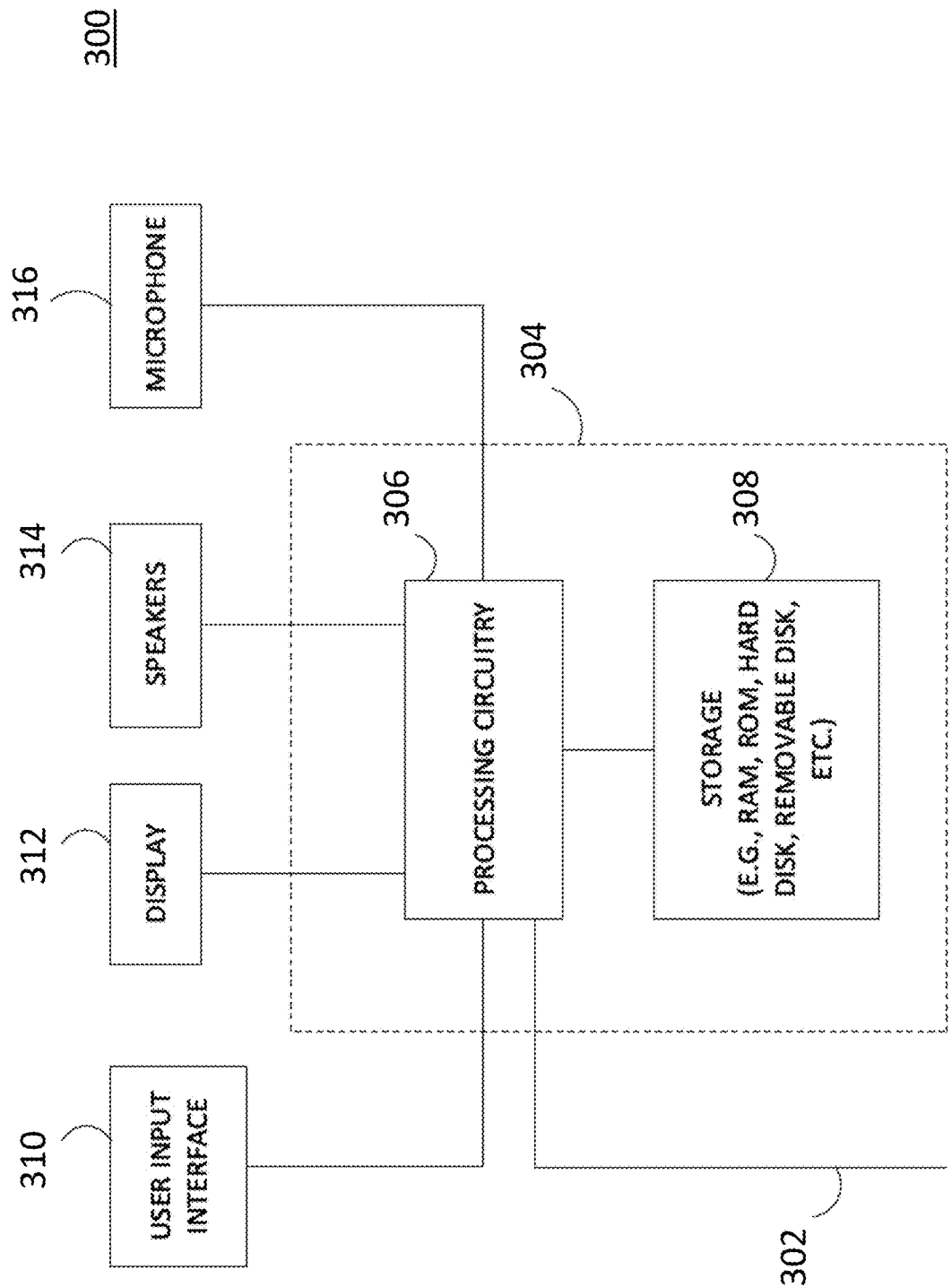
FIG. 3 is a block diagram of an electronic device used for sharing recommendations (and other content), in accordance with some embodiments of the disclosure.

In some embodiments, the control circuitry 220 and/or 228 of a system, such as the system described in FIG. 2, may initiate a process of having the guest device share OTT media asset recommendations on the host device. The initiation may be performed based on any of the following triggers:

When the guest and host devices are connected to the same local area network (LAN);

When the guest and host devices are in the same vicinity;

When the user associated with guest device is in the field of view of a camera of the host device;

When the guest and host devices are detected by using a discovery and launch (DIAL) protocol; or When the guest device scans a QR code displayed on the host device.

Figure 6:
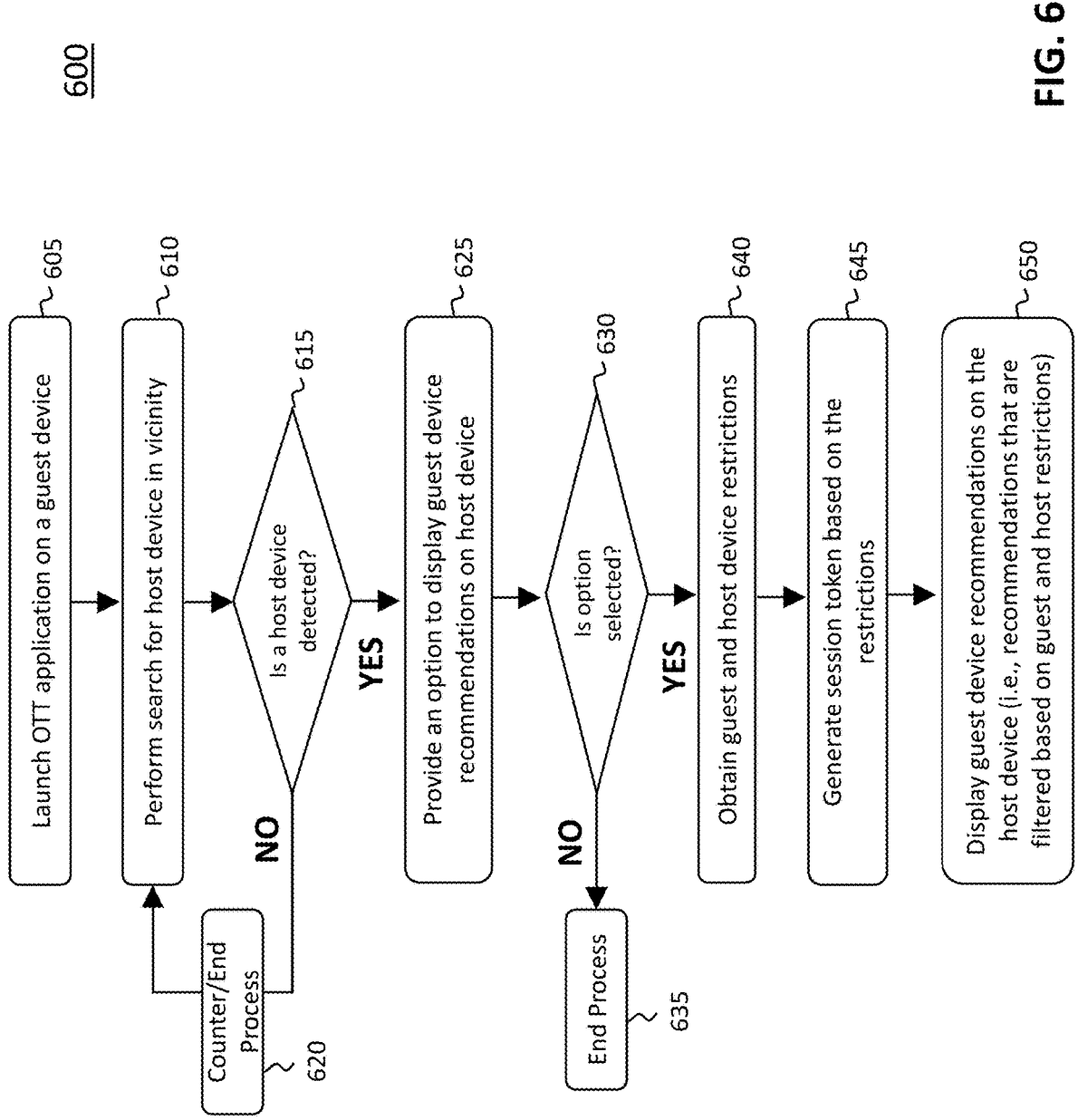
FIG. 6 is an example of a process of a guest device to launch an OTT application and share content and recommendations provided in the OTT application with a host device, in accordance with some embodiments of the disclosure.

In other embodiments, the control circuitry 220 and/or 228 may initiate a process of having the guest device share OTT media asset recommendations on the host device when the guest device launches the OTT application, such as Netflix™, as further described in description of FIG. 6.

Once devices are detected, the control circuitry 220 and/or 228 may determine which device is the host device and which device is the guest device based on OTT profiles associated with the devices, such as their Netflix™ profiles. The control circuitry 220 and/or 228 may obtain any restrictions to sharing and displaying on the host device. For example, the control circuitry may obtain any restrictions that the guest device, or the OTT account of the user of the guest device, may have stored in its profile for content that is not to be shared on a host device, such as due to privacy reasons. The control circuitry may also determine restrictions by the host device on types of content that the host device, or the OTT account of the user of the host device, does not want displayed. For example, the host device, or the OTT account of the user of the host device, may not want any adult content displayed because there are children in the house where the host device, such as a TV, is located. Additional restrictions by the OTT provider, such as not displaying any content to which the host device does not have a subscription, may also be determined.

Based on all the restrictions, a session token may be issued. The session token may be used to display personalized OTT media asset recommendations that are associated with an OTT streaming account linked or associated with the guest device on the host device. For example, personalized movies that are recommended for the guest device and/or profile, based on the guest device consuming other movies using an OTT application and an account on the OTT application associated with the guest device (or user associated with the guest device) may be displayed on the host device. These personalized recommendations may be stored on an OTT server, such as a Netflix™ server, that is linked to an OTT account associated with the guest device or user associated with the guest device. The session token, in some embodiments, can be used by the host device to pull in the personalized media asset recommendations associated with the guest user and then display the recommendations on the host device. A variety of display formats may be used, such as displaying media asset recommendations that are common to both the guest and the host devices and/or accounts/profiles in an area separate from all the other media asset recommendations. Some examples of display formats are provided in FIGS. 12 and 13.

Turning to the figures, FIG. 1 is a block diagram of an example of a process for sharing recommendations (and other content) for a guest device or its associated OTT account on a host device without having the guest device log in or logging in to its OTT account via the host device, in accordance with some embodiments of the disclosure. The process 100 may be implemented, in whole or in part, by systems or devices such as those shown in FIGS. 2-3. One or more actions of the process 100 may be incorporated into or combined with one or more actions of any other process or embodiments described herein. The process 100 may be saved to a memory or storage (e.g., any one of those depicted in FIGS. 2-3) as one or more instructions or routines that may be executed by a corresponding device or system to implement the process 100.

In some embodiments, at block 101, control circuitry of a system, such as control circuitry 220 and/or 228 of system 200 in FIG. 2, detects a guest device and a host device. The detection may be via a plurality of embodiments as described in further detail in the description related to FIG. 3. The process of detecting the guest and host devices and their associated profiles may be based on processes as described in further detail in the descriptions related to FIGS. 4-8.

In some embodiments, as depicted in block 101, electronic devices connect to the same Wi-Fi network in a house, conference room at work, classroom, or public area (e.g., bar, sports arena, gym, café). When the electronic devices are present on the same LAN, the control circuitry receives a notification and determines the profiles associated with the electronic devices at block 102. In one embodiment, the trigger can be opening a particular application associated with a streaming service. For example, the process is initiated when a user (e.g., guest device) opens a Netflix™ app on their mobile device and logs into their Netflix™ account.

In some embodiments, the host device is a television, such as a smart TV, a large display, or any electronic device that has a display and can access an OTT streaming account via an OTT streaming application downloaded on the host device. For example, the host device may be associated with, have an account on, and be able to access streaming services of, for example, Netflix™, Amazon Prime Video™, Apple TV™, Xfinity Stream™, Sling™, HBO Max™, Disney Plus™, Hulu™, Crackle™, Hotstar™, StarZ™, etc.

The host device may, for example, have an account with Netflix™ or Amazon Prime Video™ and, based on its account, be subscribed to a particular subscription tier that allows the host device to access media assets that are provided in that tier of subscription.

In some embodiments, the guest device is a handheld or portable electronic device, such as a mobile telephone, a smartphone, a personal computer television (PC), a handheld computer, an extended reality (XR) device (e.g., virtual, augmented, or mixed reality device, a virtual or augmented reality headset), or any other electronic device that has a display and can access an OTT streaming account. For example, the guest device may be associated with, have an account on, and be able to access streaming services of, for example, Netflix™, Amazon Prime Video™, Apple TV™, Comcast™, Sling™, HBO Max™, Disney Plus™, Hulu™, Crackle™, Hotstar™, StarZ™, etc.

The guest device may, for example, have an account with Netflix™ or Amazon Prime Video™ and, based on its account, be subscribed to a particular tier of subscription that allows the guest device to access media assets that are provided in that tier of subscription.

When both the guest device, or devices, and the host device are connected to the same LAN (e.g., same Wi-Fi), the control circuitry determines which device is the host device and which device is the guest device. Since the Wi-Fi is familiar to the host device and the host device may frequently connect to the Wi-Fi network, the control circuitry 220 and/or 228 may, based on the history or the frequency of access to the Wi-Fi network, identify the device as the host device. In other embodiments, the control circuitry may determine whether the device is a host, or a guest device based on the type of device, e.g., such as a 65-inch television being a host device on which content is to be displayed and likely not a guest device.

Likewise, the control circuitry 220 and/or 228 may, based on history or frequency of access to the Wi-Fi network, identify the device as a guest device. For example, the guest device may have lesser number of connections to the LAN or may have been connected to the LAN at a lesser frequency than the host device. In other embodiments, a profile associated with the guest device may identify the primary LAN, which may not be the current LAN the guest device is connected to. Based on the designation of the primary LAN used by the guest device and the current LAN address not being the primary LAN listed in the guest device's profile, the control circuitry 220 and/or 228 may identify the device as a guest device.

In other embodiments, other methods of identifying guest and host devices include, as depicted in block 101, identifying based on vicinity of devices. In some embodiments, the control circuitry 220 and/or 228 may determine a threshold distance. If the guest device(s) and host device are within the predetermined threshold distance, the control circuitry 220 and/or 228 may move to the next steps in process 100. This may include the control circuitry 220 and/or 228 determining whether the guest device wants to share its content, such as media asset recommendations that are specific for the guest device, on the host device and if so, accessing the guest and host device profiles in block 102 and performing the remaining steps in process 100. Since simply having two devices within the threshold distance is not an indication of the guest device wanting to share its media asset recommendations on the host device, the control circuitry 220 and/or 228 may prompt the host device to allow the sharing and also determine whether the guest device is interested in sharing. It may do so via presenting selectable prompts on the host and guest devices to approve the sharing.

In yet another embodiment, detection of a guest device, as depicted in block 101, may be via a camera of the host device, as will be further described in the description of FIG. 6. In this embodiment, the control circuitry 220 and/or 228 may access a camera associated with the host device, such a camera of a smart television. The control circuitry 220 and/or 228 may also access any other camera that is located in the same room as the host device. Using the camera, the control circuitry 220 and/or 228 may determine if an individual enters the field of view (FOV) of the camera. When the control circuitry 220 and/or 228 detects an individual in the FOV, the control circuitry 220 and/or 228 may perform a facial recognition analysis to determine whether the individual is associated with an OTT streaming service account that is also associated with the host device. For example, if someone lives in a household and frequently watches Netflix™ on their television (the host device), then the camera would recognize the individual based on facial recognition as an individual associated with the household and with the host device.

If the control circuitry 220 and/or 228 does not recognize the individual in the FOV or recognizes the individual as someone who does not live in the same household, or someone not associated with an OTT streaming service account that is also associated with the host device, then control circuitry 220 and/or 228 determines that the individual is associated with a guest device. Once the host and guest device(s) are identified, the control circuitry 220 and/or 228 may proceed to the next step in process 100. This may include the control circuitry 220 and/or 228 determining whether the guest device wants to share media asset recommendations that are specific for the guest device on the host device and if so, accessing the guest and host device profiles in block 102 and performing the remaining of the steps in process 100.

In some embodiments, a DIAL protocol may be used by the control circuitry 220 and/or 228 to detect the presence of the host and guest devices. In this embodiment, the host device may implement the server side of the DIAL protocol that allows guest devices (e.g., mobile devices) to discover applications running on a DIAL server. The DIAL protocol defines how a second screen application (e.g., an application on a guest device, such as a mobile device) can connect and interact with a first screen application on a host device (e.g., a streaming application such as Netflix™ on a smart TV).

In some embodiments, the communication may be initiated by the guest device, while in other embodiments, the communication may be initiated from the host device. For example, a guest device may initiate communication by sending a request (after discovering a DIAL service on the host device) to determine whether the application is available on the host device implementing the DIAL server, and based on the response from the DIAL server, the guest device can determine the status of the application (e.g., installed, running, installable, etc.). The DIAL protocol requires DIAL clients to send an M-SEARCH request to discover DIAL servers. Once host and guest device(s) are identified by using the DIAL protocol, the control circuitry 220 and/or 228 may proceed to the next steps in process 100.

In some embodiments, the control circuitry 220 and/or 228 may display a QR code on the host device and await scanning of the QR code by a guest device to proceed to the next steps of process 100. Once a guest device scans the QR code, the control circuitry 220 and/or 228 may receive a notification that a guest device has expressed interest in displaying recommendations customized for the guest device on the display of the host device. The control circuitry 220 and/or 228 may then proceed to the next steps in process 100.

In some embodiments, the control circuitry 220 and/or 228 may display a password on the display of the host device. Once a guest device enters the password, the control circuitry 220 and/or 228 may receive a notification that a guest device has expressed interest in displaying recommendations customized for the guest device on the display of the host device. The control circuitry 220 and/or 228 may then proceed to the next steps in process 100.

In yet other embodiments, the control circuitry 220 and/or 228 may transmit multicast packets to all devices periodically that are on the same LAN or within a particular vicinity of the host device. The multicast packets may include information for the guest devices, to which the guest devices may respond to indicate interest in sharing the guest device-related recommendations on the host device. The control circuitry 220 and/or 228 may then proceed to the next steps in process 100.

Although some embodiments of detecting a guest device are mentioned in block 101, the embodiments are not so limited. Other embodiments for detecting guest devices or detecting an interest of a guest device to display guest device-related media asset recommendations, which are personalized for the guest device (or an OTT streaming account associated with the guest device) based on the guest device consumption history (or consumption history via the OTT streaming account associated with the guest device), on the host device are also contemplated.

As referred to in block 101, and in other parts of this application, the guest device may share different types of content on the host device. For example, it may share content, such as content viewing history, with the host device that belongs to friends and family. It may also share content that includes media asset recommendations, based on the content viewing history, that have been provided to the guest device. For example, based on the guest device's media consumption history, an OTT service (e.g., Netflix™) may recommend additional content. If the user or guest profile is watching an action movie, it may recommend other action movies for the user to watch. If the user or the guest profile is watching media assets with a specific actor, such as Tom Cruise, the OTT service may recommend additional content that includes Tom Cruise. The OTT service may provide the recommendations based on genre, actor, producer, or any other factors related to the consumed media assets.

Although personalized recommendations and media asset consumption history has been described in relation to a guest device throughout, the embodiments are not so limited. For example, the guest device may be associated with an OTT streaming account, such as a Netflix™ account for Robert. There may be several other devices that Robert owns (or uses) using which Robert may log into the same OTT streaming account on Netflix™. All such media consumptions on Robert's OTT streaming account, regardless of which device, such as guest device or any other device used by Robert, may be used to determine the Robert's consumption history, and determine personalized media asset recommendations based on such consumption history.

In other words, in some embodiments, the OTT service may provide recommendations based not only on the content consumed on the guest device, but on any content consumed on any other device that is associated with the same OTT streaming account as the guest device. For example, an individual (Robert) may have a Netflix™ account and may watch media assets that can be accessed by him via the Netflix™ account on his mobile device, home television, and work laptop. As long as Robert consumes media assets on his mobile device, home television, and work laptop that are linked under the same OTT streaming service account and/or profile, the OTT streaming service may provide other media asset recommendations based on Robert's consumption history on any of those devices. All or at least some of such recommendations may be shared by Robert on the host device.

At block 102, a determination of who is watching may be performed by the control circuitry 220 and/or 228. Once the control circuitry 220 and/or 228 detects guest and host devices in block 101, the control circuitry 220 and/or 228 may access profiles associated with each device to determine who is watching media assets from an OTT streaming service. In some embodiments, the control circuitry 220 and/or 228 may determine that a single guest device is on the same network, within the vicinity, within the field of view of the host device or detected via DIAL protocol and close to the host device. In another embodiment, the control circuitry 220 and/or 228 may determine that multiple guest devices are on the same network, within the vicinity of the host device, within the field of view of the host device, or detected via DIAL protocol and close to the host device.

In some embodiments, at block 102, the control circuitry 220 and/or 228 may determine that John's device is the host device. The control circuitry 220 and/or 228 may also determine that Sally and Tom's devices are on the same network, within the vicinity, within the field of view of the host (John)'s device or detected via DIAL protocol and close to John's device.

The control circuitry 220 and/or 228 may, through various means (including via notification, alert, SMS, etc.) prompt the guest devices, i.e., Sally and Tom, to share their personalized media asset recommendations on the host device. In some embodiments, the control circuitry 220 and/or 228 may determine that Sally does not wish to display her personalized media asset recommendations on the host device; however, Tom does wish to display his personalized media asset recommendations on the host device so that both Tom and John can browse through the personalized media asset recommendations of Tom (and John) and select a media asset, such as a movie, for consumption.

At block 103, the control circuitry 220 and/or 228 determines restrictions with respect to both the host and guest devices/OTT profiles. In some embodiments, the control circuitry 220 and/or 228 may access a profile associated with the host device. The control circuitry 220 and/or 228 may obtain preferences and restrictions associated with the host device. For example, in the associated profile of the host device, the preferences may include which type of media assets are preferred for display on the host device when a guest device's recommendations or other content is being shared.

The profile associated with the host device may also include restrictions on what cannot be displayed on the host device. For example, a Netflix™ profile associated with a Netflix™ account that is accessed via the host device may include restrictions on what cannot be displayed on the host device. These restrictions, referred to herein as host device restrictions, or the first set of restrictions, may be restrictions such as cannot display adult content, cannot display horror movies, cannot display media assets that include a particular movie star since the user associated with the host profile may view that movie star as not appropriate for his kids who usually watch TV with him.

The restrictions on the host device may also be time based. For example, the restrictions may indicate that during the hours of 3:00 PM to 8:00 PM any content that is above a PG13 level cannot be displayed. This may be because the house in which the host device is located may include kids that usually watch TV or are in the same room as the TV within hours of 3:00 PM to 8:00 PM and the user associated with the host device may not want any content that is above the PG 13 level to be displayed during the hours when their kids are awake.

The restrictions on the host device, or an OTT streaming account associated with the host device, may also be genre based. For example, the restrictions may indicate that genre is relating to violence, bad language, horror and may not be displayed on the host device.

The restrictions on the host device, or an OTT streaming account associated with the host device, may also be rule based. In this embodiment, the user associated with the host device may create a rule for what type of content cannot be displayed on the host device. For example, the rule may indicate that a particular game in the second round of playoffs in the NBA™ may not be displayed because the user associated with the host device has not yet consumed games in the first round of playoffs in the NBA™. In another example, the rule may indicate that a third episode in a series may not be displayed because the user has not yet consumed the second episode in the same series. The user associated with the host device, or an OTT streaming account associated with the host device, may generate or create any other type of rule to allow or prevent type of content that can be displayed on the host device.

As depicted in block 103, John, who is associated with the host device, has restricted media assets relating to the genre of action, comedy, or educational. John has also restricted any media assets that are rated above the PG 13 rating. John has also restricted any media assets that relate to the second round of playoffs in the NBA. John has further restricted any media assets that include the actor John Doe in them.

At block 103, the control circuitry 220 and/or 228 determines restrictions with respect to a guest device. These are restrictions that the guest device does not want displayed on the host device. In a general setting, when a user associated with the guest device accesses their OTT streaming account on guest device itself, then the user associated with the guest device is able to see their entire consumption history and all the media assets recommended to the user based on their personalized consumption history. However, the user associated with the guest device may not want to display all their personalized consumption history or personalized recommendations based on the consumption history on a host device, such as due to privacy reasons. For example, if the user associated with the guest device watches adult content on their own guest device, the user may not want to share such sensitive and private information publicly on a host device where other people may also be able to see what the guest user has been consuming. As such, due to privacy and sensitive reasons, the user may choose to restrict such content from being displayed on the host device.

In some embodiments, the user associated with the guest device may select specific tiles that are displayed on the guest device interface. These tiles may include an icon, picture, or another depiction of a media asset that is approved for sharing. The tiles may also be color marked or distinguished from each other based on their approved/not approved sharing status. These may be media assets in the guest user's wish list or library, or recommendations that may have been automatically provided by the OTT service provider based on the user's consumption history.

In some embodiments, the user associated with the guest device may select an entire row, column, or some other combination of media assets displayed on the guest device interface for sharing on the host device or restricting from being shared on the host device.

The restrictions on sharing may be based on genre, or on specific attributes of a media asset, such as producer, actor, director, etc. The restrictions may also prevent media assets that are a certain rating, such as rated R, from being shared. The restrictions on the guest device may also be rule based. For example, the rule may be that if the media asset was previously shared with the same host device, then it may be automatically shared. The rule may also be that if the media asset was previously shared publicly, such as by a post on a social media platform, by the user associated with the guest device, then the media asset be automatically shared on the host device. Other types of rules may also be generated.

The OTT service may apply some restrictions as well. For example, certain media assets that are approved for sharing by the guest device may not be shared on the host device if the host does not have a subscription to consume such media assets. For example, the guest device may have a higher tier of subscription than the host device. In that embodiment, the guest device may have access to additional media assets that are not available to a lower-tiered subscription level. In that embodiment, the OTT service provider may enable a restriction that prevents the higher-tiered media assets from being displayed on the host device. In other embodiments, the OTT service provider may display the media assets that are in the higher tier on the host device but display a lock symbol on the media assets and unlock the media assets only upon the host device upgrading their subscription to the tier in which the media assets are available for consumption.

In some embodiments, the control circuitry 220 and/or 228 may invoke an artificial intelligence (AI) engine to execute an artificial intelligence (AI) algorithm for automatically determining which content items that are associated with an OTT streaming account linked to the guest device to restrict from being displayed on the host device. These restricted content items may include the guest device consumption history, personalized recommendations based on the consumption history, and those media assets that have not previously been displayed publicly.

The AI algorithm may also provide suggestions of the type of content that should not be shared by the guest device on the host device. Such recommendations may be based on a pattern of prior sharing, which may be obtained from an execution of a machine learning algorithm or based on the relationship between the user associated with the guest device and the user associated with the host device. For example, if a determination is made based on the AI algorithm that the user associated with the guest device is at his mom's house, where the mom is the user associated with the host device, then the AI algorithm may automatically exclude all content that is not family-friendly. The relationship between the user associated with a guest device and the user associated with the host device may be determined based on their profiles, social media, speech input such as the guest user referring to the host user as their mom, and other methods.

At block 104, the control circuitry 220 and/or 228 may combine all the restrictions an issue a session token based on the combined restrictions. As depicted, the control circuitry 220 and/or 228 at block 104 has combined restrictions of both John, who is the user associated with the host device, and Tom, who is the user associated with the guest device. In some embodiments, the control circuitry 220 and/or 228 may also combine restrictions placed by the OTT service provider, such as the subscription lock mentioned above.

The session token may act as a session ID allowing sharing of OTT content associated with an OTT account that is linked with the guest device, such as personalized recommendations of media assets that were provided to the guest device based on the guest device's Netflix™ or other OTT account consumption history, on the host device.

At block 105, the control circuitry 220 and/or 228 may generate a temporary session based on the session token issued and display content allowed via the token on the host device. As referred to herein, the temporary session is a session in which the guest is continuing to share their personalized content on the host device.

In some embodiments, the control circuitry 220 and/or 228 may generate a guest profile on the host device and display recommendations that were customized for the guest once the guest profile has been selected on the host device. In other embodiments, the control circuitry 220 and/or 228 may display a separate strip, such as in a style of a filmstrip as displayed in FIGS. 12 and 13, on the host device along with recommendations that are in a separate strip that are customized for the host device. As such, both personalized recommendations of media assets for the host device and the guest device may be seen in parallel and simultaneously next to each other, such as one may be on the top and another on the bottom, or any other vertical or horizontal arrangement.

In some embodiments, the control circuitry 220 and/or 228 may determine which media asset recommendations are common to both the guest device and the host device. For example, based on the host device consumption history, the control circuitry 220 and/or 228 may recommend an action movie, such as "Indiana Jones-Raiders of the Lost Ark," for consumption by the user associated with the host device. Based on the consumption history of the user associated with the guest device, the control circuitry 220 and/or 228 may also recommend "Indiana Jones-Raiders of the Lost Ark" for consumption by the user associated with the guest device. Since "Indiana Jones-Raiders of the Lost Ark" is recommended separately both for the host device and the guest device, the control circuitry 220 and/or 228 may identify the movie as common recommendation between both devices and as such generate a separate strip which includes all the media assets that are commonly recommended to both the host and guest devices.

At block 106, the control circuitry 220 and/or 228 may execute temporary session actions. These actions may be performed while the temporary session, at block 105, is still ongoing. In some embodiments, the action may include obtaining consumption data related to the temporary session. The data obtained may be used to detect a pattern of consumption between this specific guest and the host such that future personalized recommendations of media assets may be made based on the obtained consumption data. The future recommendations may be made when the user associated with the guest device logs in to their own OTT account or when the user associated with the host device logs in to their own OTT account. The future personalized recommendations based on the data obtained during the temporary session may also be made only when the users associated with the guest and host devices are together, since the data is representative of combined consumption of both users associated with the guest and host devices.

In another embodiment, the data obtained from the temporary session may be used to update viewing progress of the host and/or guess profile. For example, in one scenario, both users associated with the guest device and host device (or users via their profiles) may have started watching a movie together. However, when the guest device has disconnected from a LAN which the host device is connected to, or when the playback of the content is paused or stopped, the users associated with the guest device and host device may not have finished consuming the movie to its end. In this scenario, the playback data obtained from the temporary session may be used to update the viewing progress on their associated profiles. The data obtained from the temporary session may be used to indicate, for example, that guest device has consumed episode 2 of a show that both users associated with the guest and host device were consuming during the temporary session and now be presented with episode 3 of the series. The control circuitry may present episode 3 even when the temporary session is no longer in progress, such as by displaying, "Up next", on the OTT application user interface of the guest device. The progress of each other's consumption progress may also be provided on each other's OTT user interface when both guest and host device authorize such notification and progress monitoring.

In another embodiment, the data obtained may be used to generate a wish list of media assets that the guest user (user associated with the guest device) and the host user (user associated with the host device) would like to consume at a future time. The wish list may be stored on either the guest device, host device, both, and/or at a server.

At block 107, control circuitry 220 and/or 228 may terminate the temporary session under any one or more of the following circumstances. These circumstances include when the guest device leaves the LAN network, when the guest device exceeds the distance threshold, when the guest device terminates the temporary session, and when a higher level of subscription is required by the host device to consume the recommendation shared by the guest device.

In some embodiments, the temporary session may be terminated when the guest device leaves the LAN network. This may occur when the guest device disconnects from the LAN network on which the host device is connected.

In some embodiments, the temporary session may be terminated when the guest device exceeds the predetermined distance threshold, in other words, the guest device has moved farther away from the host device or from the location of the router or modem associated with the LAN network. The user associated with the guest device may leave the home of the user associated with the host device, and when the guest device exceeds a distance from the LAN router, cable, or modem, a determination is made that the guest device has left the vicinity and the temporary session is terminated.

In some embodiments, the temporary session may be terminated when the guest device terminates the session. The termination may be when manual operations are performed on the guest device to disconnect from the LAN or terminate the temporary session. In some embodiments, the control circuitry 220 and/or 228 may prompt the guest device, such as based on noticing no activity for a predetermined period of time, as to whether the guest device wishes to disconnect from the LAN. Based on no response or an affirmative response to disconnect, the control circuitry 220 and/or 228 may terminate the temporary session. In other embodiments, the control circuitry 220 and/or 228 may determine no activity for a predetermined period of time by the guest device and automatically terminate the temporary session.

In some embodiments, the guest device may create rules on when to terminate the session after the guest device has left the LAN network or exceeded the distance threshold from a router or hub of the LAN network. For example, if the guest device has left in the midst of playback of a media asset, such as in the middle of a movie that was playing in the temporary session, the guest device may generate a rule to terminate the session after the ending of the media asset. The rules may also be generated to terminate the temporary session at a certain time, after the current temporary session, after the host has disconnected from the LAN or logged off their OTT streaming account. In some embodiments, the host may be able to request an extension to continue consuming media assets or viewing media asset recommendations that were shared by the guest device for an additional amount of time. In such circumstances, the guest device may receive the request and respond with an option to extend or terminate the session.

In some embodiments, a guest device may share personalized recommendations of media assets that are recommended based on the guest device consumption history. These media assets may be allowed for consumption for the guest device but not the host device if the guest device has paid for a higher subscription than the host device. In this embodiment, the control circuitry 220 and/or 228 may provide the host device an option to upgrade the subscription such that the media assets designated for a higher level of subscription can be consumed by the host device. The control circuitry 220 and/or 228 may provide a certain amount of time for the host device to upgrade their subscription, and if the host device does not upgrade in the allotted time, then it may terminate the session. In other embodiments, the control circuitry 220 and/or 228 may notify the host of the higher-level subscription needed to access the media assets that are designated for the higher-level subscription and terminate the session automatically since the host device does not have the higher-level subscription.

At block 108, the control circuitry 220 and/or 228 may execute post temporary session actions. These actions may include sharing dynamic wish lists, sharing post temporary session consumption of either the guest or the host with each other, and providing consumption alerts. In some embodiments, after the temporary session at block 107 has terminated, either the host or the guest may desire to continue tracking the other's consumption and dynamic wish list to stay updated. The control circuitry 220 and/or 228 may execute post-session actions to allow them to track such consumption and dynamic wish list.

In some embodiments, the guest who has left the temporary session, such as Tom at block 103 who has gone home from his friend John's (host) house where both of them were consuming media assets during the temporary session, may desire to be notified on what John, or his guest profile, ended up watching after Tom left or terminated the temporary session. Accordingly, the control circuitry 220 and/or 228 may present options to John to authorize sharing of post-session consumption with the guest device (Tom's device). The host may allow the sharing of post temporary-session consumption with the guest device and may terminate whenever desired. The sharing of post temporary-session consumption with the guest device may also be timed and automatically terminated unless renewed by the hosts.

In some embodiments, the user associated with the host device may want to know what the guest consumed after they left the temporary session. Accordingly, the control circuitry 220 and/or 228 may present options to the guest to authorize sharing of post temporary session consumption with the host device and allow the guest to terminate the sharing anytime as desired.

Likewise, the control circuitry 220 and/or 228 may present options to both the host and guest device to share their wish list with each other. The wish list shared may be static, i.e., up until the point in time of the temporary session. The wish list shared may be dynamic, i.e., continuously, or periodically updated based on post temporary session activities by guest or the host. For example, once a guest device terminates the temporary session and authorizes the sharing of their dynamic wish list, if the guest device adds additional items on their wish list after the temporary session, such additions are also shared with the host device.

In some embodiments, the control circuitry 220 and/or 228 may provide an option for the guest or the host device to receive consumption alerts. For example, if the guest device leaves in the midst of a media asset that was being consumed in the temporary session, then the guest device may receive an alert when the host device completes the consumption of the media asset.

FIG. 2 is a block diagram of an exemplary system for sharing recommendations (and other content) for a guest device on a host device without having the guest device log in, or logging in, to its OTT account via the host device, in accordance with some embodiments of the disclosure.

FIGS. 2 and 3 also describe example devices, systems, servers, and related hardware that may be used to implement processes, functions, and functionalities described at least in relation to FIGS. 1, and 4-16. Further, FIGS. 2 and 3 may also be used for accessing an individual's personalized media asset recommendations in an OTT streaming environment on a public device without having the individual log in via the public device into their own OTT streaming account. FIGS. 2 and 3 may also be used for detecting launch of an OTT application on a guest device, launch of an OTT application on a host device, accessing the OTT profiles of guest and host devices to determine which is host and which is a guest device, accessing personalized media asset recommendations for OTT accounts associated with the guest and host services, determining sharing and display restrictions of OTT accounts associated with the guest and host services, generating session tokens, generating temporary sessions, performing various actions during the temporary session, such as collecting consumption data of media assets browsed or consumed during the temporary session, generating wish lists and storing them in OTT profiles associated with guest and host devices, determining consumption patterns of users associated with guest and host OTT accounts, determining common personalized media assets between accounts associated with guest and host devices, determining whether guest and host devices are connected to a same LAN, determining and implementing rules concerning termination of a temporary session, determining whether guest and host device are within a threshold vicinity of each other, and performing functions related to all other processes and features described herein.

In some embodiments, one or more parts of, or the entirety of system 200, may be configured as a system implementing various features, processes, functionalities, and components of FIGS. 1, and 4-16. Although FIG. 2 shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as electronic device 300 of FIG. 3.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store various types of content (e.g., guest and host device profiles, profiles associated with various OTT accounts, restrictions associated with the OTT streaming account associated with the guest device, restrictions associated with the OTT streaming account associated with the host device, session tokens, consumption history associated with OTT streaming account associated with the guest and host devices, personalized media asset recommendations associated with OTT streaming account associated with the guest and host devices, LAN data relating to connection and disconnection of guest and host devices, patterns of consumption for guest and host devices and their associated OTT accounts, and wish lists associated with OTT streaming account associated with the guest and host devices, and AI and ML algorithms). Non-volatile memory may also be used (e.g., to launch a boot-up routine, launch an app, render an app, and other instructions). Cloud-based storage may be used to supplement storages 224, 238 or instead of storages 224, 238. In some embodiments, data relating to guest and host device profiles, profiles associated with various OTT accounts, restrictions associated with the OTT streaming account associated with the guest device, restrictions associated with the OTT streaming account associated with the host device, session tokens, consumption history associated with OTT streaming account associated with the guest and host devices, personalized media asset recommendations associated with OTT streaming account associated with the guest and host devices, LAN data relating to connection and disconnection of guest and host devices, patterns of consumption for guest and host devices and their associated OTT accounts, and wish lists associated with OTT streaming account associated with the guest and host devices, and AI and ML algorithms, and data relating to all other processes and features described herein, may be recorded and stored in one or more of storages 212, 238.

In some embodiments, control circuitries 220 and/or 228 executes instructions for an application stored in memory (e.g., storage 224 and/or storage 238). Specifically, control circuitries 220 and/or 228 may be instructed by the application to perform the functions discussed herein. In some implementations, any action performed by control circuitries 220 and/or 228 may be based on instructions received from the application. For example, the application may be implemented as software or a set of executable instructions that may be stored in storage 224 and/or 238 and executed by control circuitries 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, in response to determining launch of an OTT application on a guest device, the control circuitry 228 may search for a host device on which personalized media assets that are recommended for the OTT streaming account associated with the guest device can be displayed. It may also perform steps of processes described in FIGS. 1, and 5-8, including determining, based on restrictions provided, which personalized media asset recommended for an OTT streaming account associated with the guest device to display on the host device.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data personalized media asset recommendations based on user input and consumption of media assets. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be an electronic device, a personal computer (PC), a laptop computer, a tablet computer, a WebTV box, a personal computer television (PC/TV), a PC media server, a PC media center, a handheld computer, a mobile telephone, a smartphone, or a device that can perform function of accessing an OTT server and displaying personalized media asset recommendations, or any other device, computing equipment, or wireless device, and/or combination of the same capable of suitably determining consumption history associated with an OTT guest user account, generating personalized recommendations based on the consumption history, determining any sharing ad display restrictions, and displaying the personalized recommendation on a host device based on a generated token which takes into account all restrictions, including restrictions associated with guest and host device's OTT streaming account.

Control circuitries 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitries 220 and/or control circuitry 218 are configured for accessing an individual's personalized media asset recommendations in an OTT streaming environment on a public device without having the individual log in via the public device into their own OTT streaming account. Control circuitries 220 and/or control circuitry 218 are also configured for detecting launch of an OTT application on a guest device, launch of an OTT application on a host device, accessing the OTT profiles of guest and host devices to determine which is host and which is a guest device, accessing personalized media asset recommendations for OTT accounts associated with the guest and host services, determining sharing and display restrictions of OTT accounts associated with the guest and host services, generating session tokens, generating temporary sessions, performing various actions during the temporary session, such as collecting consumption data of media assets browsed or consumed during the temporary session, generating wish lists and storing them in OTT profiles associated with guest and host devices, determining consumption patterns of users associated with guest and host OTT accounts, determining common personalized media assets between accounts associated with guest and host devices, determining whether guest and host devices are connected to a same LAN, determining and implementing rules concerning termination of a temporary session, determining whether guest and host device are within a threshold vicinity of each other, and performing functions related to all other processes and features described herein.

Computing device 218 receives a user input 204 at input circuitry 216. For example, computing device 218 may receive data relating to launch of an OTT application on a guest device or consumption of media assets via an OTT account that is associated with the user of the guest device.

Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, 5G, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, 5G, or other wireless transmission protocols.

Processing circuitry 240 may receive input 204 from input circuit 216. Processing circuitry 240 may convert or translate the received user input 204 that may be in the form of voice input into a microphone, or movement or gestures to digital signals. In some embodiments, input circuit 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1, 5-8, respectively.

FIG. 3 is a block diagram of an electronic device used for consuming a content item, in accordance with some embodiments of the disclosure. In some embodiments, the equipment device 300, is the same equipment device 202 of FIG. 2. The equipment device 300 may receive content and data via input/output (I/O) path 302. The I/O path 302 may provide audio content. The control circuitry 304 may be used to send and receive commands, requests, and other suitable data using the I/O path 302. The I/O path 302 may connect the control circuitry 304 (and specifically the processing circuitry 306) to one or more communications paths or links (e.g., via a network interface), any one or more of which may be wired or wireless in nature. Messages and information described herein as being received by the equipment device 300 may be received via such wired or wireless communication paths. I/O functions may be provided by one or more of these communications paths or intermediary nodes but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 or i9 processor).

In client-server-based embodiments, the control circuitry 304 may include communications circuitry suitable for determining accessing an individual's personalized media asset recommendations in an OTT streaming environment on a public device without having the individual log in via the public device into their own OTT streaming account. The control circuitry 304 may include communications circuitry suitable for detecting launch of an OTT application on a guest device, launch of an OTT application on a host device, accessing the OTT profiles of guest and host devices to determine which is host and which is a guest device, accessing personalized media asset recommendations for OTT accounts associated with the guest and host services, determining sharing and display restrictions of OTT accounts associated with the guest and host services, generating session tokens, generating temporary sessions, performing various actions during the temporary session, such as collecting consumption data of media assets browsed or consumed during the temporary session, generating wish lists and storing them in OTT profiles associated with guest and host devices, determining consumption patterns of users associated with guest and host OTT accounts, determining common personalized media assets between accounts associated with guest and host devices, determining whether guest and host devices are connected to a same LAN, determining and implementing rules concerning termination of a temporary session, determining whether guest and host device are within a threshold vicinity of each other, and performing functions related to all other processes and features described herein.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 308 may be used to store various types of content, (e.g., guest and host device profiles, profiles associated with various OTT accounts, restrictions associated with the OTT streaming account associated with the guest device, restrictions associated with the OTT streaming account associated with the host device, session tokens, consumption history associated with OTT streaming account associated with the guest and host devices, personalized media asset recommendations associated with OTT streaming account associated with the guest and host devices, LAN data relating to connection and disconnection of guest and host devices, patterns of consumption for guest and host devices and their associated OTT accounts, and wish lists associated with OTT streaming account associated with the guest and host devices, and AI and ML algorithms). Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the electronic device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the electronic device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing. In some embodiments, voice assistants (e.g., Siri, Alexa, Google Home and similar such voice assistants) receive and process the voice commands and other speech.

The electronic device 300 may include an interface 310. The interface 310 may be any suitable user interface, such as a remote control, mouse, trackball, keypad, keyboard, touchscreen, touchpad, stylus input, joystick, or other user input interfaces. A display 312 may be provided as a stand-alone device or integrated with other elements of the electronic device 300. For example, the display 312 may be a touchscreen or touch-sensitive display. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 310 may be HDTV-capable. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The equipment device 300 of FIG. 3 can be implemented in system 200 of FIG. 2 as primary equipment device 202, but any other type of user equipment suitable for allowing communications between two separate user devices for performing the functions related to implementing machine learning (ML) and artificial intelligence (AI) algorithms, and all the functionalities discussed associated with the figures mentioned in this application.

Figure 4:
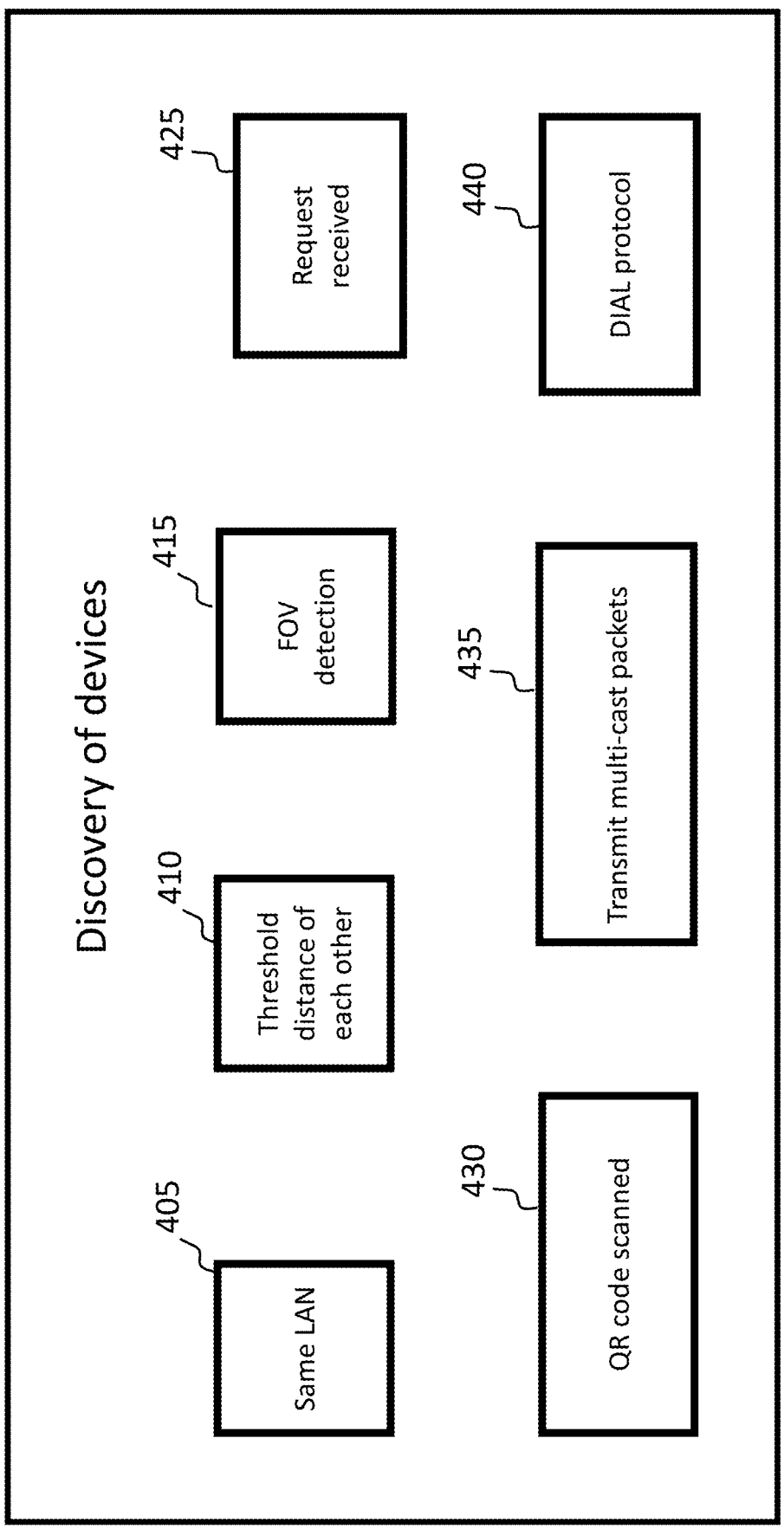
FIG. 4 is a block diagram of exemplary methods through which host and/or guest devices are discovered to allow the guest device to share its content on the host device, in accordance with some embodiments of the disclosure.

FIG. 4 is a block diagram of exemplary methods through which host and/or guest devices are discovered to allow the guest device to share its content on the host device, in accordance with some embodiments of the disclosure.

FIGS. 1, 5-8 that relates to sharing content from a guest device, such as media asset recommendations that are personalized for the guest device based on the guest device's consumption history, on the host device, based on discovering that the guest device and host device are on the same local area network (LAN) 405. In this embodiment, the control circuitry 220 and/or 228 may receive a notification when a guest device and a host device connected to the same LAN, such as via Wi-Fi. Based on the determination, the control circuitry 220 and/or 228 may determine that the guest device intends to share its content (such as media asset recommendations, user consumption history, etc.) on the host device and process the next steps, such as steps indicated at blocks 102-108 of FIG. 1.

In some embodiments, the control circuitry 220 and/or 228 may initiate the process of FIGS. 1, 5-8 that relates to sharing content from a guest device, such as media asset recommendations that are personalized for the guest device based on the guest device's consumption history, on the host device, based on discovering that the guest device and host device are within a threshold distance of each other 410. In this embodiment, the control circuitry 220 and/or 228 may obtain the locations of the guest and host device, such as through a GPS, and determine whether the devices are within a predetermined threshold distance of each other. The predetermined threshold distance may be set by the control circuitry to ensure that the devices are close in proximity, such as in the same house, in the same conference room, within a certain distance of a display screen in a bar, etc. Based on the determination that the guest device and the host device are within a predetermined threshold distance of each other, the control circuitry 220 and/or 228 may determine that the guest device intends to share its content (such as media asset recommendations, user consumption history, etc.) on the host device and process the next steps, such as steps indicated at blocks 102-108 of FIG. 1.

FIGS. 1, 5-8 that relates to sharing content from a guest device, such as media asset recommendations that are personalized for the guest device based on the guest device's consumption history, on the host device, based on a field of view (FOV) 415 detection. In this embodiment, the control circuitry 220 and/or 228 may access a camera that is associated with the host device. For example, this camera may be attached to a smart TV (host device). In other examples, the cameras may be situated in other parts of the room where the host device is located. For example, there may be a security or IoT camera that monitors the space around the host device, such as in a bar, or security camera in a home. The control circuitry 220 and/or 228 may access such cameras to determine whether an individual is within its FOV.

Once a determination is made that an individual is within its FOV, the control circuitry 220 and/or 228 may perform facial recognition analysis to determine whether the individual is associated with an OTT streaming account that is also associated with the host device. If a determination is made that the individual is not associated with the same streaming OTT account as the host device, then the control circuitry 220 and/or 228 may determine that the individual is a guest user associated with a guest device. Based on the determination that the user is a guest user associated with a guest device, the control circuitry 220 and/or 228 may determine that the guest device intends to share its content (such as media asset recommendations, user consumption history, etc.) on the host device. Accordingly, the control circuitry 220 and/or 228 may process the next steps, such as steps indicated at blocks 102-108 of FIG. 1.

In some embodiments, the control circuitry 220 and/or 228 may initiate the process of FIGS. 1, 5-8 that relates to sharing content from a guest device, such as media asset recommendations that are personalized for the guest device based on the guest device's consumption history, on the host device, based on receiving a request 425 from the guest device to share OTT content linked with the guest device's OTT account on the host device. In this embodiment, a user associated with the guest device may make a request on their user interface associated with an OTT streaming account requesting to share their content on the host device. The control circuitry 220 and/or 228 receiving that request may await approval from the host device and upon approval allow the sharing by processing the next steps, such as steps indicated at blocks 102-108 of FIG. 1.

In some embodiments, the control circuitry 220 and/or 228 may initiate the process of FIGS. 1, 5-8 that relates to sharing content from a guest device, such as media asset recommendations that are personalized for the guest device based on the guest device's consumption history, on the host device, based on the guest device scanning a QR code 430 displayed on the host device. When the QR code is scanned, the control circuitry 220 and/or 228 may allow the sharing by the guest device by processing the next steps, such as steps indicated at blocks 102-108 of FIG. 1.

In some embodiments, the control circuitry 220 and/or 228 may initiate the process of FIGS. 1, 5-8 that relates to sharing content from a guest device, such as media asset recommendations that are personalized for the guest device based on the guest device's consumption history, based on responses received for multicast packets 435 transmitted to guest devices. In this embodiment, the control circuitry may transmit multicast packets to all devices periodically that are on the same LAN or within a particular vicinity of the host device. The multicast packets may include information for the guest devices. Upon receiving the information, the guest device(s) may respond to indicate interest in sharing the guest device-related personalized media asset recommendations on the host device. The control circuitry 220 and/or 228 may then proceed to the next steps, such as steps indicated at blocks 102-108 of FIG. 1, when a response from the guest device indicating an interest to share is received.

FIGS. 1, 5-8 that relates to sharing content from a guest device, such as media asset recommendations that are personalized for the guest device based on the guest device's consumption history, on the host device, based on discovering the guest device and host device by using a DIAL protocol 440. In this embodiment, a DIAL protocol may be used to detect the presence of the host and guest devices. For example, a host device may implement the server side of the DIAL protocol that allows guest devices to discover applications running on a DIAL server. Based on discovery of devices by use of the DIAL protocol, the control circuitry 220 and/or 228 may determine that the guest device intends to share its content (such as media asset recommendations, user consumption history, etc.) on the host device and process the next steps, such as steps indicated at blocks 102-108 of FIG. 1.

Figure 5:
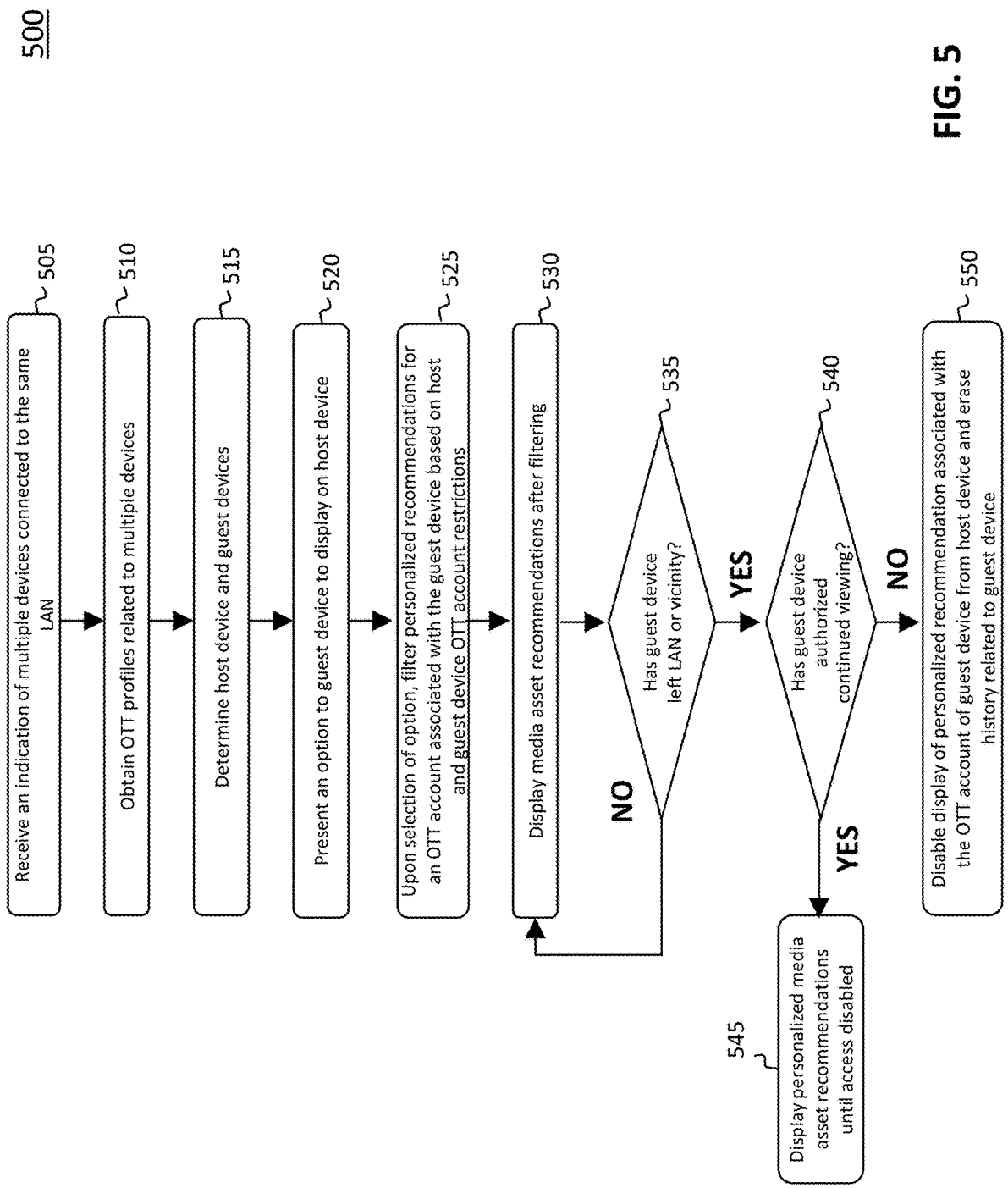
FIG. 5 is a block diagram of an example of a process for a guest device to share and disable sharing of its content on a host, in accordance with some embodiments of the disclosure.

FIG. 5 is a block diagram of an example of a process for a guest device to share and disable sharing of its content on a host device, in accordance with some embodiments of the disclosure. The process 500 may be implemented, in whole or in part, by systems or devices such as those shown in FIGS. 2-3. One or more actions of the process 500 may be incorporated into or combined with one or more actions of any other process or embodiments described herein. The process 500 may be saved to a memory or storage (e.g., any one of those depicted in FIGS. 2-3) as one or more instructions or routines that may be executed by a corresponding device or system to implement the method 500.

In some embodiments, at block 505, control circuitry of a system, such as control circuitry 220 and/or 228 of system 200 in FIG. 2, receives an indication of multiple devices connected to the same LAN. The control circuitry 220 and/or 228 may receive a notification when such multiple devices are connected to the same LAN. There may be a single guest device or multiple guest devices and one or more host devices connected at the same time.

At block 510, the control circuitry 220 and/or 228 may obtain OTT profiles related to the multiple devices that are connected to the same LAN. For example, the control circuitry 220 and/or 228 may access Netflix™ profiles of users associated with multiple devices connected to the same LAN.

At block 515, the control circuitry 220 and/or 228 may determine which of the devices is a host device and which device is a guest device. The control circuitry 220 and/or 228 make such a determination based on the profiles of the guest and host devices. For example, since the host device may frequently connect to the same LAN, the control circuitry 220 and/or 228 may determine the device to be host device since a host device is likely to connect frequently or at least at a higher number of times than a guest to the same LAN, such as a LAN at a home or office. The guest and host devices may also self-identify as being host and guest devices.

At block 520, the control circuitry 220 and/or 228 may present an option to the guest device to display content, such as personalized media asset recommendations for the guest device, on the host device. The option may be presented as a pop-up or as an overlay in a user interface of the OTT application running in the guest device. The control circuitry 220 and/or 228 may also present the option using other methods, such as a text message or an e-mail to the guest device.

At block 525, upon selection of the option to present on the host device by the guest device, such as an approval to display on the host device, the control circuitry 220 and/or 228 may perform filtering options to determine which personalized media asset recommendations and other OTT content that is associated with an OTT account that is linked with the guest device to display on the host device. These filtering options may be based on restrictions provided in a profile related to the guest device. For example, the guest device may not want to share certain media asset recommendations, such as those that relate to adult content, or other recommendations that are based on consumption history of the user of the guest device that the user considers to be private. The user associated with the guest device may not want to share certain content also based on their relationship with the user associated with the host device. For example, they may be visiting their parents or work colleagues, or meeting someone for a first time and visiting their home, etc. Circumstances surrounding the place they are visiting, i.e., the user associated with the guest device visiting the place where the host device is located, may be considered in determining what should be displayed. For example, content that is violent and loud should not be displayed on a host device in a hospital. As such, based on the relationship and circumstances, the user associated with the guest device may want only certain types or genres of content to be displayed on the host device and may not want disclosed all the recommendations that would give other individuals viewing the host device insight into what the user associated with the guest device consumes.

The control circuitry 220 and/or 228 may filter based on guest device restrictions as well as host device restrictions. The host device may have restrictions, such as cannot display adult content, cannot display horror movies, cannot display media assets that are outside of preferred genre, cannot display media assets that include a particular movie star or are from a particular production company. The host device may also have restrictions that are time-based, such as cannot display content that is rated above PG 17 before 9:00 PM (since the kids in the home of the host device go to bed at 9:00 PM, and only PG 17 content is allowed when the kids are watching the host device).

The host device may also generate rules about when to implement certain restrictions. For example, a rule may indicate that a particular game in the second round of playoffs in the NBA may not be displayed if the user has not yet consumed games in the first round. The rule may indicate that a third episode in a series may not be displayed because the user has not yet consumed the second episode in the same series. The rules may also include not displaying any content that relates to a competitor; for example, a bar may not want media assets, such as advertisements of another bar that competes with them or other places that are not approved, to be displayed.

Figure 12:
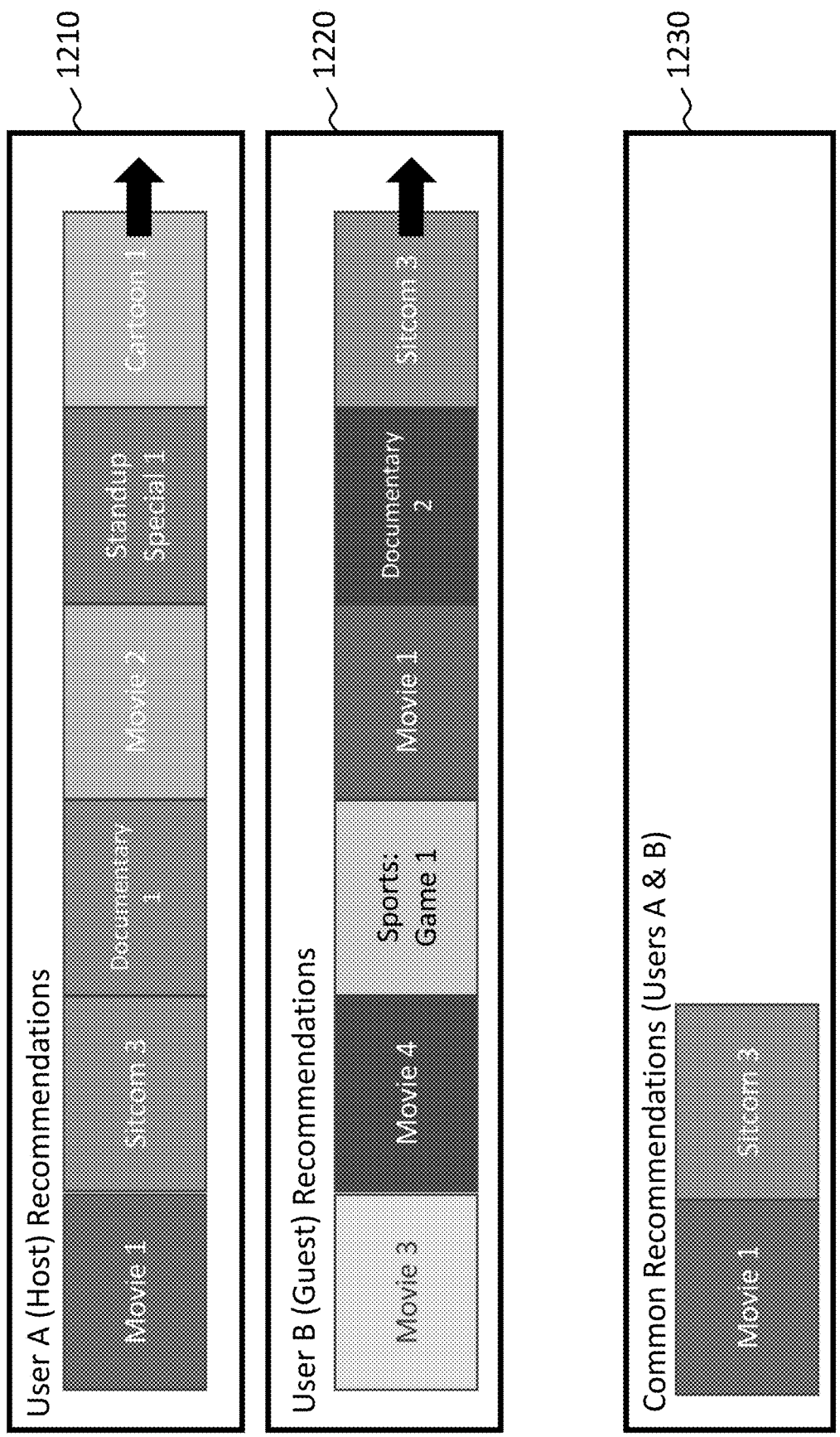
FIG. 12 is a block diagram of filmstrip-style presentation of recommendations of a host device and/or a guest device, and common media asset recommendations that are displayed on the host device, in accordance with some embodiments of the disclosure.
Figure 13:
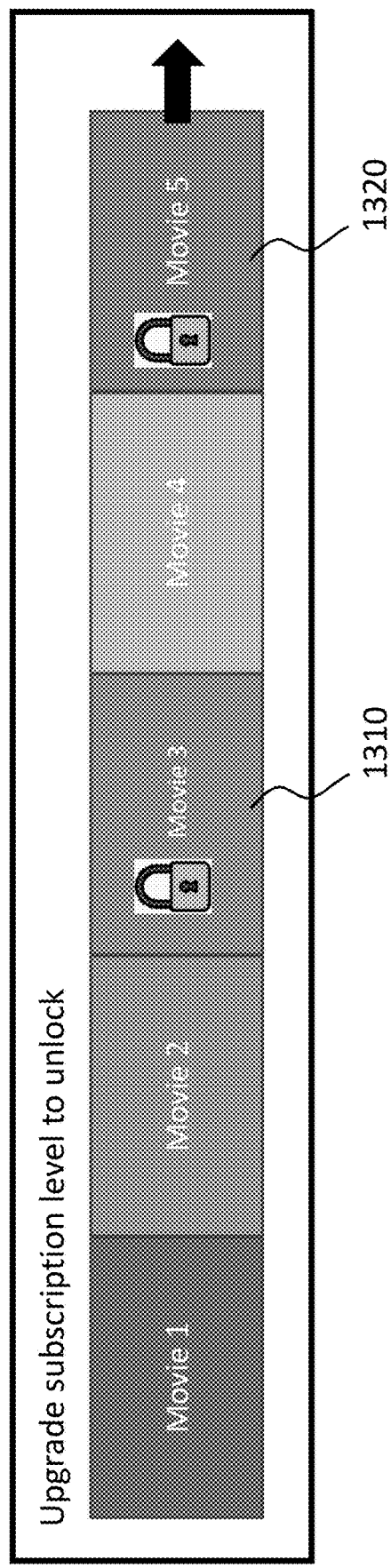
FIG. 13 is a block diagram of filmstrip-style presentation of recommendations for a guest device displayed on the host device when the host device does not have the upgraded subscription to consume the displayed media asset recommendations, in accordance with some embodiments of the disclosure.

At block 530, the control circuitry 220 and/or 228 may establish a temporary session and display media asset recommendations or other content after filtering the media asset recommendations based on both host and guest restrictions. Some examples of displays are depicted in FIGS. 12 and 13.

At block 535, the control circuitry 220 and/or 228 determines whether the guest device has left the LAN or the vicinity of the host device. As described earlier, the control circuitry 220 and/or 228 may determine a threshold distance for continuing the established temporary session. The control circuitry 220 and/or 228 may terminate the temporary session if a determination is made that the guest device has moved outside of the threshold distance from the host device.

If a determination is made at block 535 that the guest device has not left the LAN or the vicinity, which is defined by the predetermined threshold distance, then the control circuitry 220 and/or 228, at block 530, may continue to display the media asset recommendations on the host device in the temporary session established.

If a determination is made at block 535 that the guest device has left the LAN or the vicinity, then the control circuitry 220 and/or 228, at block 550, may terminate the temporary session at block 550 and erase all consumption history related to the temporary session. In other embodiments, the control circuitry 220 and/or 228, at block 550, may not terminate the temporary session or make available the consumption history and data generated during the temporary session if the guest device has authorized continued consumption and date retention for the host device at block 545. If the guest device has authorized continued consumption for the host device, then the control circuitry 220 and/or 228 may continue the temporary session until the guest device terminates the temporary session.

In some embodiments, such as based on the approval of the guest device, the control circuitry may obtain consumption data related to the temporary session and use it for various purposes. These use cases and purposes may include, for example, to detect a pattern of consumption between this specific guest and the host such that future recommendations of media assets may be made based on the obtained consumption data or to generate a wish list of media assets that the guest user and the host user would like to consume at a future time.

FIG. 6 is an example of a process of a guest device to launch an OTT application and share content and recommendations provided in the OTT application with a host device, in accordance with some embodiments of the disclosure.

The process 600 may be implemented, in whole or in part, by systems or devices such as those shown in FIGS. 2-3. One or more actions of the process 600 may be incorporated into or combined with one or more actions of any other process or embodiments described herein. The process 600 may be saved to a memory or storage (e.g., any one of those depicted in FIGS. 2-3) as one or more instructions or routines that may be executed by a corresponding device or system to implement the method 600.

In some embodiments, at block 605, control circuitry of a system, such as control circuitry 220 and/or 228 of system 200 in FIG. 2, may detect that a guest device has launched an OTT application. For example, a user of associated with the guest device may have selected an icon on their mobile device to launch a Netflix™ application.

At block 610, the control circuitry 220 and/or 228 may perform a vicinity search for a host device that is within a threshold distance of the guest device. In some embodiments, a vicinity search may be performed in response to the guest device launching the OTT application. In another embodiment, the vicinity search may be performed in response to the guest device indicating a request to display media asset recommendations on a host device. In this embodiment, the control circuitry 220 and/or 228 may obtain location of the guest and host device, such as through a GPS, and determine whether the devices are within a predetermined threshold distance of each other. The predetermined threshold distance may be set by the control circuitry to ensure that the devices are close in proximity, such as in the same house or hotel room. Based on the determination that the guest device and the host device are within a predetermined threshold distance of each other, the control circuitry 220 and/or 228 may, at block 625, display an option on the guest device, such as a selectable option, for the guest device to display content (such as media asset recommendations, user consumption history, etc.) on the host device.

In another embodiment, based on the determination that the guest device and the host device are not within a predetermined threshold distance of each other, the control circuitry 220 and/or 228 may, at blocks 610 and 620, continue searching for a host device until the counter for continued searching has reached its limit or timed out after a certain duration of time.

At block 630, the control circuitry 220 and/or 228 may determine whether an option to display its content on a host device has been selected by the guest device. If a determination is made that the guest device does not want to display its content on the host device, then the process may end at block 635.

If, at block 630, the control circuitry 220 and/or 228 determines that the guest device has selected an option to display its content on the host device, then the control circuitry 220 and/or 228, at block 640, may filter what is to be displayed. This filtering may be based on restrictions of both the guest and host devices. The filtering may also be based on any restrictions from the OTT service provider, such as do not display any recommendations that are not in the subscribed tier level of the host device, or to display media assets to which the host device does not have a subscription as locked, until the host device upgrades to unlock the media asset for consumption.

At block 645, control circuitry 220 and/or 228 may generate a session token to establish a temporary session during which the guest device may share its content on the host device without having the guest device log in to its OTT account via the host device. The session token may act as a session ID allowing sharing of OTT content that is linked with the guest device, such as recommendations of media assets that were provided to the guest device based on the guest device's consumption history, on the host device. The OTT content, such as personalized media asset recommendations, may be saved on an OTT server associated with the OTT application, such as a Netflix™ server that is associated with a Netflix™ account linked to the guest device.

At block 650, the control circuitry 220 and/or 228 may generate a temporary session based on the session token issued and display personalized guest device media asset recommendations, such as in any of the exemplary formats of FIGS. 12 and 13, on the host device.

Figure 7:
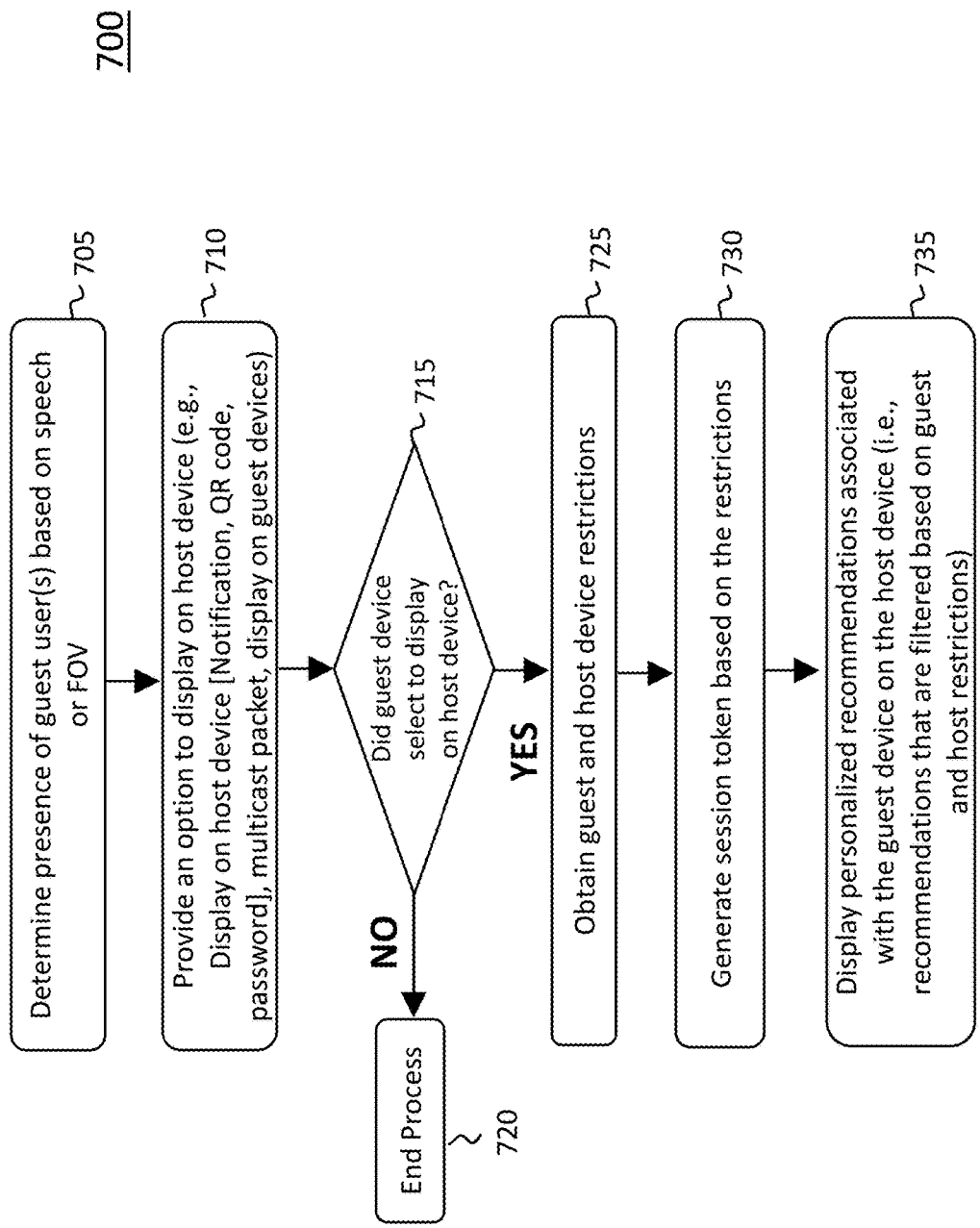
FIG. 7 is an example of a process of detecting the presence of a guest device based on camera and speech input and providing options for the guest device to share its content on the host device, in accordance with some embodiments of the disclosure.

FIG. 7 is an example of a process of detecting the presence of a guest device based on camera and speech input and providing options for the guest device to share its content on the host device, in accordance with some embodiments of the disclosure.

The process 700 may be implemented, in whole or in part, by systems or devices such as those shown in FIGS. 2-3. One or more actions of the process 700 may be incorporated into or combined with one or more actions of any other process or embodiments described herein. The process 700 may be saved to a memory or storage (e.g., any one of those depicted in FIGS. 2-3) as one or more instructions or routines that may be executed by a corresponding device or system to implement the method 700.

In some embodiments, at block 705, control circuitry of a system, such as control circuitry 220 and/or 228 of system 200 in FIG. 2, may detect the presence of a potential user based on a speech input or based on the FOV of a camera associated with the guest device.

In some embodiments, the control circuitry 220 and/or 228 may utilize listening devices, such as Alexa™, Siri™, Google Assistant™, that are situated in the vicinity of the host device to listen in on conversations of individuals. The control circuitry 220 and/or 228 may then analyze the conversations and match the voices with stored voice profiles to determine whether the voices in the conversation are related to any of the users that are associated with the host device. If they are not, then the control circuitry 220 and/or 228 may determine that the voices belong to guest users that may be associated with guest devices.

In some embodiments, the control circuitry 220 and/or 228 may analyze the speech input obtained, such as speech input via listening devices or by the microphone associated with the host device. The analysis may be used in determining what type of media assets to recommend during a temporary session. For example, in one exemplary scenario, a few friends may have gathered together at a house in which the host device is located. The friends may be discussing what type of movie to watch, such as action, drama, etc. Some of them may refer to a new movie released or to a particular actor. The control circuitry 220 and/or 228 may listen in on the conversation, analyze the speech input of the conversation, and determine related media assets for recommendation. The control circuitry 220 and/or 228 may also list these media assets first since they are the most relevant to the recent conversation. The control circuitry 220 and/or 228 may also prominently display these media assets, such as by highlighting them, showing them in a different color, showing their icons in a larger size, drawing an outline around them, or depicting them in any more prominent way than other media assets. The control circuitry 220 and/or 228 may also prominently display these media assets by overlaying an icon, such as an icon on the movie poster, or present an average number that indicates a match to both users or profiles associated with the guest and host devices.

In some embodiments, the control circuitry 220 and/or 228 may utilize cameras associated with the host device or other cameras in the room to detect the presence of individuals in the vicinity of the host device. The control circuitry 220 and/or 228 may perform face recognition analysis to match the faces of individuals with the faces stored in profiles to determine whether the individuals are related to any of the users that are associated with the host device. If they are not, then the control circuitry 220 and/or 228 may determine that the faces belong to guest users that may be associated with guest devices.

At block 710, the control circuitry 220 and/or 228 provide options for the guest device to display content associated with an OTT streaming account that is linked to the guest device on the host device, such as media asset recommendations based on guest device consumption history. The options for the guest device to share on the host device may include the guest device responding affirmatively to a notification sent to the guest device of an option to display on the host device. The option for the guest device to share on the host device may include the guest device scanning a QR code presented on the display of the host device.

At block 715, the control circuitry 220 and/or 228 determines whether the guest device has selected an option to display on the host device. If a determination is made by the control circuitry 220 and/or 228 that the guest device has not selected an option to display on the host device, then the control circuitry 220 and/or 228 may end the process at block 720. However, if a determination is made by the control circuitry 220 and/or 228 that the guest device has selected an option to display on the host device, then, at block 725, the control circuitry 220 and/or 228 may obtain guest and host device restrictions on what is to be displayed and accordingly generate a session token at block 730 that considers those restrictions.

At block 735, the control circuitry 220 and/or 228 may generate a temporary session based on the session token issued and display guest device media asset recommendations on the host device, such as in any of the exemplary formats of FIGS. 12 and 13, on the host device. For example, the host device may use the token to pull in the personalized media asset recommendations associated with the guest user and then display them on the host device.

The guest user preferences (i.e., what content can be retrieved for display on the host device) are associated with the token described above. The token may be refreshable for security reasons and may be used to invoke a service that makes the desired content items, such as the personalized media asset recommendations, available for retrieval and display on the host device. The use of this token can be specific for establishing the temporary session and used to simplify the authentication process. For example, in one exemplary operation, the OTT service, such as Netflix™, may issue a token to an instance of the application running on the guest device based on user subscription information as well as the user associated with the guest device's location/entitlements. This token is associated with a list of content items (e.g., action row, previously watched, continue watching, etc.) that can be seen on the host device. The content associated with the guest profile, such as a Netflix™ profile, linked to the guest device can be filtered based on the tier of service or subscription that the host profile is subscribed to. For example, the guest user associated with the guest device might be subscribed to a different tier of service and therefore has access to more content than the user associated with the host device. Based on the licensing restrictions associated with a particular content item (e.g., available Out of Home), the listings may be selected.

Figure 8:
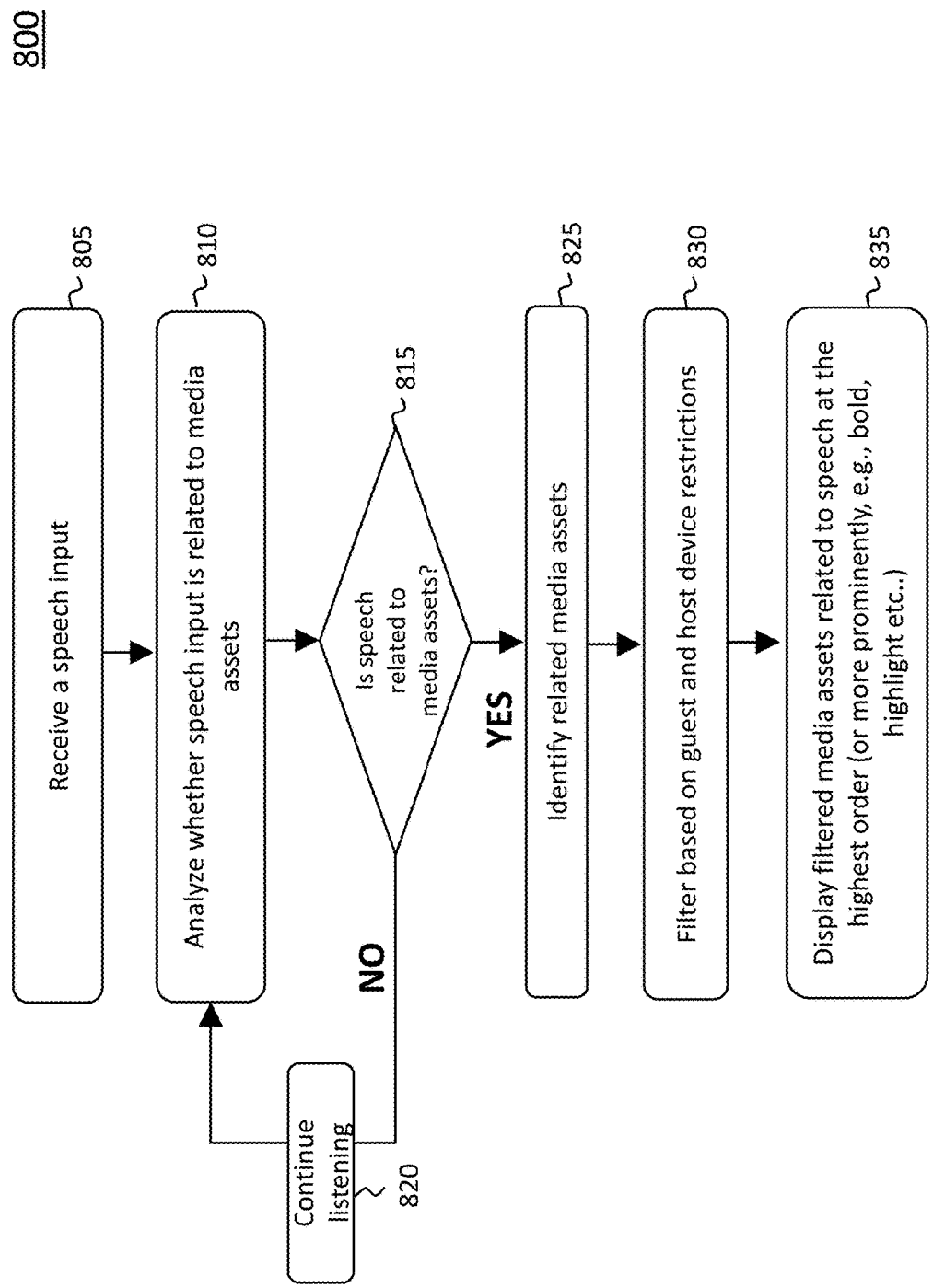
FIG. 8 is an example of automatically displaying media asset recommendations higher up in display order based on speech or camera input, in accordance with some embodiments of the disclosure.

FIG. 8 is an example of automatically displaying media asset recommendation higher up in the display order based on speech or camera input, in accordance with some embodiments of the disclosure.

In this embodiment, the control circuitry 220 and/or 228 may utilize listening devices as well as AI engines to receive and analyze speech input and determine, based on the received input, what are likely the most related media assets that may be of interest to the users engaged in the conversation.

At block 805, the control circuitry 220 and/or 228 may receive a speech input. As mentioned earlier, the speech input may be via listening devices or a microphone of the host device.

At block 810, the control circuitry 220 and/or 228 may analyze the speech input to determine whether it relates to media assets. If a determination is made at block 815 that the speech input does relate to media assets, then, at block 825, the control circuitry 220 and/or 228 may identify media assets that relate to the speech input. For example, if the speech input relates to the actor Tom Cruise and his latest movie, then the control circuitry 220 and/or 228 may identify the most current movie in which has acted.

At block 830, the control circuitry 220 and/or 228 may obtain guest and host device restrictions on what is to be displayed and accordingly display guest device media asset recommendations on the host device at block 835, such as in any of the exemplary formats of FIGS. 12 and 13, on the host device.

Figure 9:
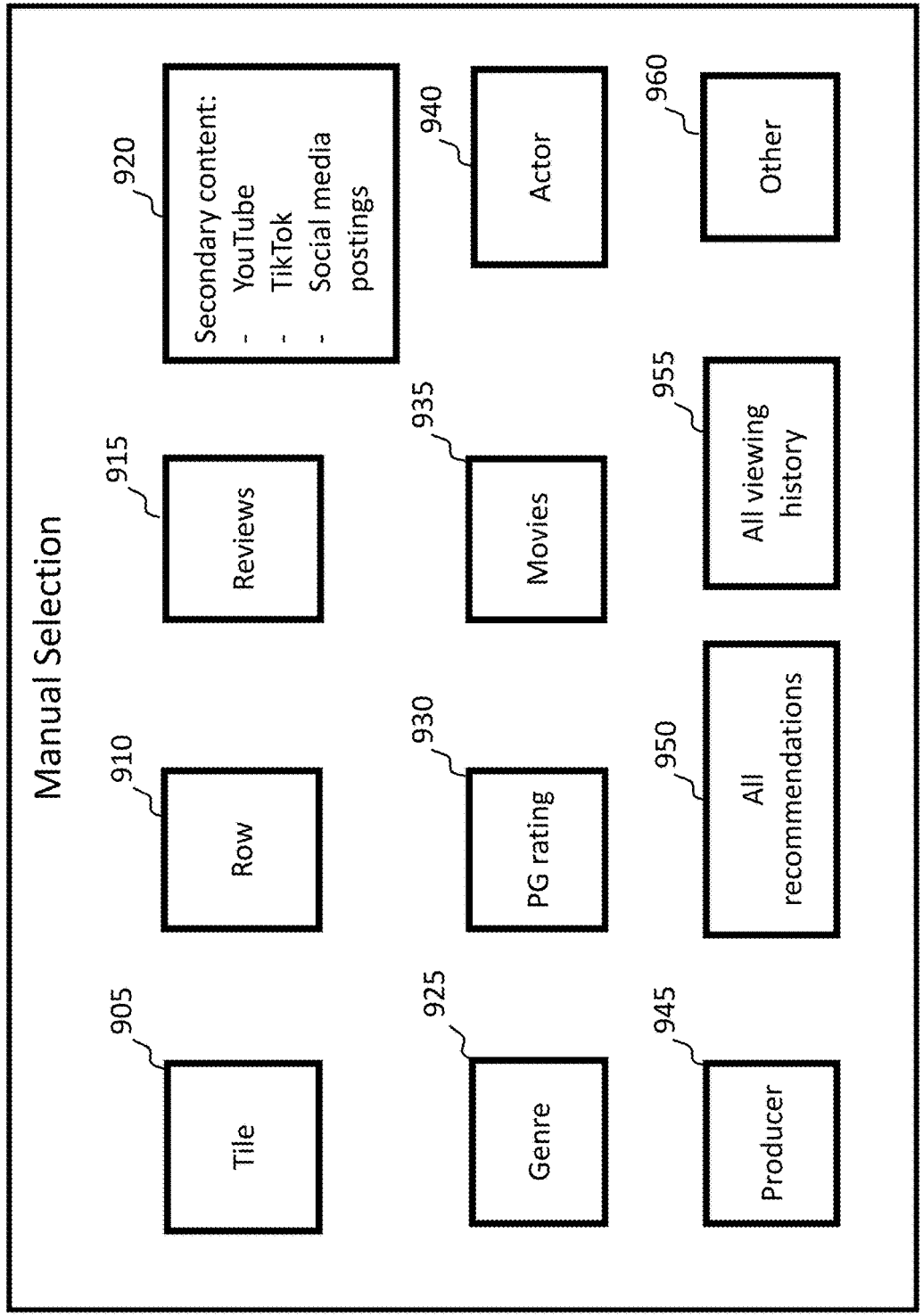
FIG. 9 is a block diagram of manual selection options provided to the guest device for selecting content to be displayed on the host device, in accordance with some embodiments of the disclosure.
Figure 10:
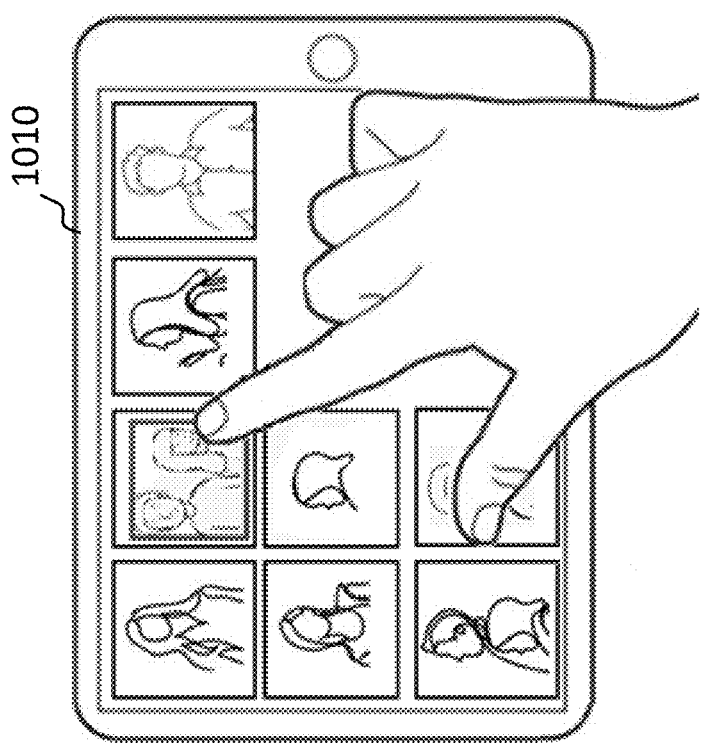
FIG. 10 is a block diagram of manual selection by tile and by row in a user interface of the guest device, in accordance with some embodiments of the disclosure.
Figure 10:
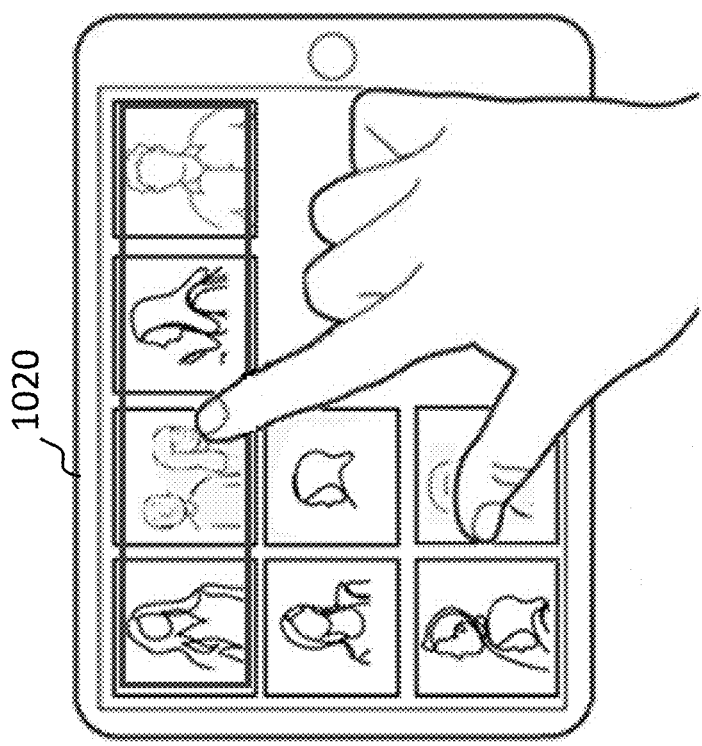

FIG. 9 is a block diagram of manual selection options provided to the guest device for selecting content to be displayed on the host device, in accordance with some embodiments of the disclosure. In some embodiments, the user associated with the guest device may select what content, i.e., recommendation of media assets, consumption history, and/or other content displayed on their OTT user interface, to share with the host device without logging in to their OTT account via the host device.

The user of the guest device may select tile 905 or a row of tiles 910 displayed on their OTT user interface to display on the host device. These rows of tiles 910 may also be organized by genre in their OTT user interface. An example of selection of a tile is depicted at block 1010 and an example of selection of a row of tiles is depicted at block 1020 in FIG. 10.

The user of the guest device may select recommended media assets based on their reviews 915, which they may limit to displaying only recommended media assets that are above a 4.0/5.0 rating or media asset recommendations that are ranked 70% or more by reviewers, such as Rotten Tomatoes™ or IMDB™.

The user of the guest device may select a recommended media asset based on the media asset being a secondary media asset 920.

The user of the guest device may select recommended media assets based on genre 925, or PG rating 930 as well. They may also select media assets that are movies 935 or that star particular actors 940 or are made by particular producers 945. They may also select based on what they previously shared publicly in their review 915, such as they may also select based on all recommendations. They may also select to display their viewing history 955. Although a few examples have been provided on what may be selected and, in the manner, how the selection may be made, the embodiments are not so limited. Any other media assets provided by the OTT service provider to which the user associated with the guest device has a subscription may be shared. The user associated with the guest device may also generate rules for sharing, such as anything shared by the user associated with the guest device on a social media platform, i.e., media assets, or recommendations of media assets, may be shared on the host device since they were already shared by the user associated with the guest device on a public platform.

The user of the guest device may also specify which content categories or rows to retrieve from their profile that is linked to an OTT streaming media account, such as their Netflix™ account. For example, the user associated with the guest device may specify to retrieve the "Recently Watched," "Continue Watching," and "Action" row for display on the host device. Such setting can be saved, or users can select in real-time what rows of content to retrieve for display. Similarly, the automatic selection and display of the content items can be conditional. For example, if the host device is logged in to a profile with restriction on content, then content items associated with the OTT streaming account linked to the guest device that violate such restriction do not get retrieved and/or displayed. Additionally, the list of content items that gets retrieved/displayed can be based on predefined user preferences. For example, the user associated with the guest device could have 'blacklisted' a content item from being shown on the host device where they are not logged-in with their credentials.

Figure 11:
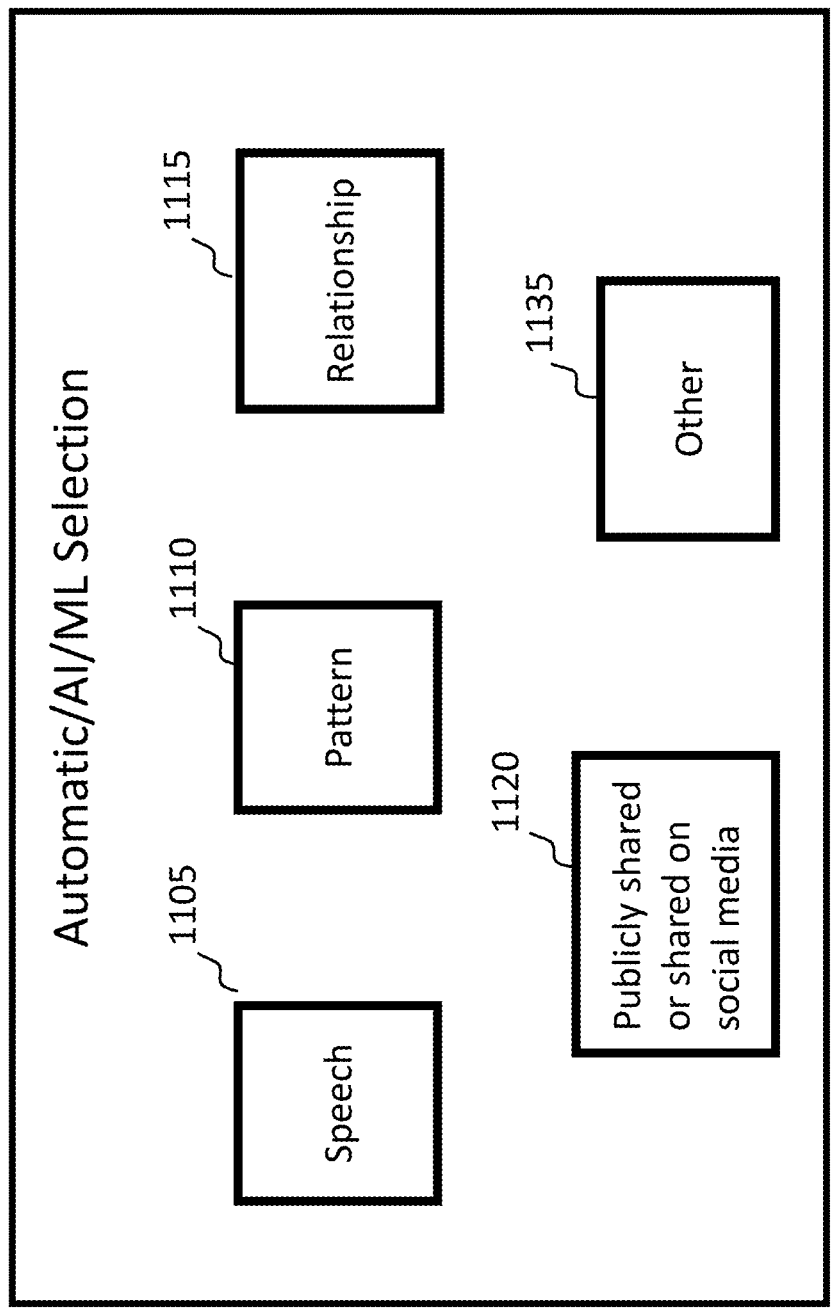
FIG. 11 is a block diagram of automatic selection of content associated with an OTT streaming account that is linked to the guest device to be displayed on the host device, in accordance with some embodiments of the disclosure.

FIG. 11 is a block diagram of selections of content associated with an OTT streaming account that is linked to the guest device that are selected automatically to be displayed on the host device, in accordance with some embodiments of the disclosure.

As described earlier in the description related to FIG. 9, the user associated with the guest device may select on their own, i.e., manually, which content, i.e., recommendation of media assets, consumption history, other content displayed on their OTT user interface, to share with the host device without logging in to their OTT account via the host device. In this embodiment, as explained below in reference to FIG. 11, instead of manual user selection, the control circuitry 220 and/or 228 automatically select content associated with an OTT streaming account that is linked to the guest device to be displayed on the display of the host device. In some embodiments, the control circuitry 220 and/or 228 may seek user approval prior to displaying content associated with an OTT streaming account that is linked to the guest device on the display of the host device.

In some embodiments, the control circuitry 220 and/or 228 may automatically select content associated with an OTT streaming account that is linked to the guest device based on a speech input. In this embodiment, the control circuitry 220 and/or 228 may analyze the speech input 1105 obtained by the microphone associated with the host device. The speech input may also be obtained by digital assistants (like Alexa™, Siri™, or Google Assistant™).

The control circuitry 220 and/or 228 may capture user speech or other input that it obtains from the microphone, digital assistants, or other IoT devices having microphones, to determine if the user referenced media assets in the user speech, or any characters or attributes mentioned in the user speech, can be associated with media assets that are available from the OTT service provider, such as Netflix™ server. For example, a listening feature of such digital assistants may overhear the user speech in which the user says, "Did you guys see him in the movie, wow—he jumped across the tallest building in the world." Based on such speech input, the control circuitry 220 and/or 228 may invoke the AI engine to run an AI algorithm to analyze the content and context of the speech input and then provide a personalized media asset recommendation.

Based on the results of the AI algorithm, the control circuitry 220 and/or 228 may determine that the reference to "movie" and "he jumped across the tallest building in the world" relates to the movie "Mission Impossible" where Tom Cruise jumps from one window to another on the Burj Khalifa, the tallest building in the world. Accordingly, the control circuitry 220 and/or 228 may display that movie as highest in order of display, such as first or at the top, when displaying recommendations on the host device.

In other embodiments, the control circuitry 220 and/or 228 may determine if the movie "Mission Impossible" where Tom Cruise jumps from one window to another on the Burj Khalifa is within the signed-up subscription level of the guest device. The control circuitry may also determine whether the movie "Mission Impossible" where Tom Cruise jumps from one window to another on the Burj Khalifa is allowed to be shared by the guest device and displayed on the host device. In other words, the control circuitry may determine restrictions of the guest and host devices and determine if the movie passes the restrictions and is allowed to be shared and displayed. If it passes all the filters, then lastly, the control circuitry may determine if the host device has subscribed to the subscription level at which the movie can be watched. If it hasn't, then the control circuitry may a) not display the movie icon/tile as a recommendation, b) display as a recommendation, however display a lock feature on it, c) ask the host device to upgrade the subscription to watch the movie, d) display the movie as long as the guest device is still on the same LAN network or within the predetermined threshold distance of the host device, or any combination thereof.

In some embodiments, the control circuitry 220 and/or 228 may automatically select content associated with an OTT streaming account that is linked to the guest device based on a detected pattern 1110. In this embodiment, the control circuitry 220 and/or 228 may utilize an ML engine to execute an ML algorithm for detecting a pattern of behavior related to the user of the guest device. In some embodiments, the pattern of behavior may relate to which content, such as media asset recommendations that are generated by the OTT application for the guest device, based its consumption history, the user of the guest device has previously shared. The pattern of behavior may be analyzed to determine whether the previously shared content was for a) the same host device as the current host device on which the content may be shared and displayed, b) on another host device, c) publicly such as on social media (e.g., as depicted at block 1120), etc. Based on the pattern of behavior, if a determination is made by the control circuitry that a particular media asset, or media asset recommendation, has been previously shared, then the control circuitry may automatically share and display such media asset and media asset recommendation on the current host device.

Although a few examples of automatically selecting content associated with an OTT streaming account that is linked to the guest device to display on the host device were described in FIG. 11, the embodiments are not so limited. Other embodiments 1135 that allow automatic selecting of content associated with an OTT streaming account that is linked to the guest device to display on the host device are also contemplated. In addition, rules may be generated, and satisfaction of the rule or rules may allow the control circuitry 220 and/or 228 to automatically select content associated with an OTT streaming account that is linked to the guest device to display on the host device.

FIG. 12 is a block diagram of filmstrip-style presentation of recommendations of a host device, guest device, and common media asset recommendations that are displayed on the host device, in accordance with some embodiments of the disclosure.

In some embodiments, the control circuitry 220 and/or 228 may display the host device and the guest device media asset recommendation in a filmstrip fashion, where the filmstrips related to the host and guest device recommendations may be displayed in a vertical format. This format may include the host device-related filmstrip on top of the guest device-related filmstrip (as depicted at 1210 and 1220) or vice versa.

In some embodiments, the control circuitry 220 and/or 228 may display the host device and the guest device media asset recommendation in a filmstrip fashion where the common media asset recommendation between the host device and guest device may be displayed in a separate filmstrip 1230.

The embodiments may include both horizontal and vertical formats in which the filmstrips may be displayed. The embodiments may also include identifying each type of media asset in a different color (e.g., movies in a different color than documentaries). The embodiments may also include identifying each genre of media asset in a different color (e.g., action movies in different color than horror movies). The embodiments may also include highlighting, embossing, displaying as a 3D tile, outlining, or overlaying certain media asset tiles different from other media asset tiles. For example, embodiments include displaying the common recommendations 1230, or other recommendations that are displayed at the highest in the display order (e.g., in a top row), such as based on recognizing that those would be relevant to a recent conversation, more prominently than other assets, such as via a different color, highlighting, embossing, displaying as a 3D tile, outlining, overlaying etc.

Although references have been made to a single guest user, the embodiments are not so limited. The embodiments may include multiple guest users whose media asset recommendations may be shared on the host device. In the embodiments when multiple guest users are displaying their media asset recommendations, the control circuitry may display all the guest users' and the host user's media asset recommendations in a suitable format that may fit on the user interface of the host device. For example, each guest user's media asset recommendations may be displayed in a separate filmstrip, and all the filmstrips may be aligned together either in a vertical or horizontal format. The control circuitry may also display all the guest users' and the host user's media asset recommendation in a grid or table format.

FIG. 13 is a block diagram of a filmstrip-style presentation of recommendations for a guest device displayed on the host device when the host device does not have the upgraded subscription to consume the displayed media asset recommendations, in accordance with some embodiments of the disclosure.

In this embodiment, if a determination is made by the control circuitry 220 and/or 228 that the host device does not have a subscription to some content, such a media asset or a media asset recommendation that is being shared by the guest device, then the control circuitry 220 and/or 228 may display any such media assets or recommendations with a lock icon on them (as depicted at blocks 1310 and 1320). When the host device upgrades to the subscription level required, then the lock may be unlocked by the OTT service provider.

Figure 14:
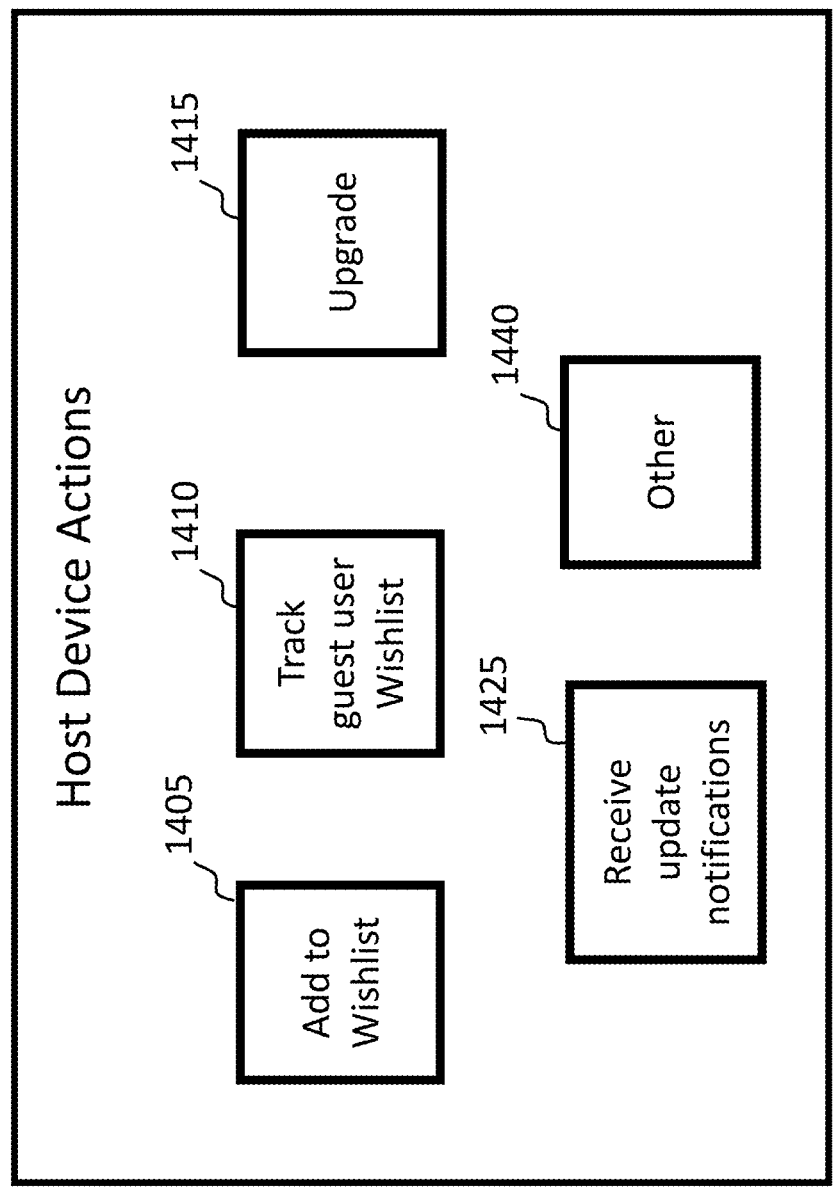
FIG. 14 is a block diagram of host device actions, in accordance with some embodiments of the disclosure.

FIG. 14 is a block diagram of host device actions, in accordance with some embodiments of the disclosure. In some embodiments, the host device may add to wish list 1405. In this embodiment, the host device may add media assets browsed or consumed on the host device during the temporary session to its wish list to consume later. In other embodiments, the host device may add media assets shared and displayed during the temporary session by the guest device its wish list to consume later.

In some embodiments, the host device may track the guest user's wish list 1410. In this embodiment, the host device may add media assets browsed or consumed on the host device during the temporary session to its wish list to consume later. In other embodiments, the host device may add media assets shared and displayed during the temporary session by the guest device to its wish list to consume later.

In some embodiments, the host device may upgrade 1415 its subscription to consume a content item shared by the guest user. In this embodiment, if a determination is made that the host device does not have a subscription to the content, such as a particular movie that is offered only to a higher-tier subscription, that is being shared by the guest device, then the host device may upgrade its subscription level to a tier that is required to unlock and consume the movie.

In some embodiments, the host device may sign up to receive updates and notifications 1425. In this embodiment, the host device may receive a notification if the guest user has added a new media asset to their wish list or has a new media asset recommendation. In order to receive the notifications, approval of the guest device may be required.

In some embodiments, the host device may request continued display of content shared by the guest device, even after the guest device has left the LAN or vicinity. The guest device may then approve or deny the request or allow the continued display for a certain duration. The guest device may also turn off the continued display of content that the guest has authorized at any time.

Although a few examples of host device actions were described in FIG. 14, the embodiments are not so limited. Other embodiments 1440 of host actions, such as requesting a different format of display for shared media asset recommendations or common media asset recommendations, or creation of profiles of guest users, are also contemplated.

Figure 15:
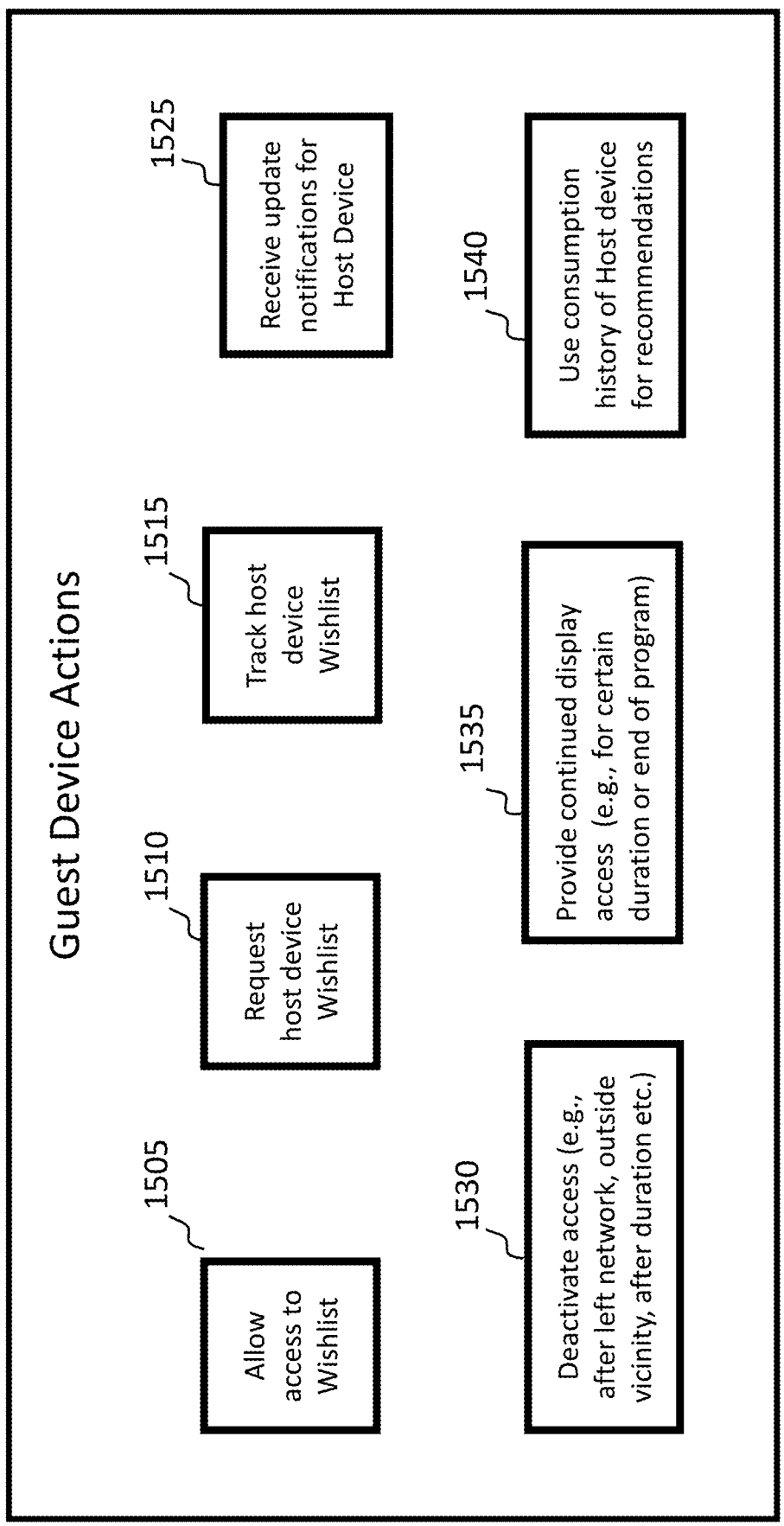
FIG. 15 is a block diagram of guest device actions, in accordance with some embodiments of the disclosure.

FIG. 15 is a block diagram of guest device actions, in accordance with some embodiments of the disclosure. In some embodiments, the guest device action includes the guest device allowing access to their wish list 1505 to the host device. In some embodiments, the guest device may request the host device wish list 1510 to be shared with the guest device, similar to blocks 1405 and 1410. In some embodiments, the guest device may track the host device's wish list 1515. In order to track the host device, approval of the host device may be required.

In some embodiments, the guest device may receive update notifications for the host device 1525. In this embodiment, the guest device may receive a notification if the host device has added a new media asset to their wish list or has a new media asset recommendation. In order to receive the notifications that relate to host device wish list additions, approval of the host device may be required.

In some embodiments, the guest device may deactivate access to the host device 1530. In this embodiment, the guest device may automatically deactivate access if the guest device has left the LAN or vicinity. In other embodiments, if the guest device has provided continued access 1535 to the host device after it has left, it may deactivate at any time. It may also set automatic deactivation at the end of a program currently being consumed by the host device.

In some embodiments, the guest device or control circuitry may use the consumption history of the host device 1540 for recommending media assets to the guest device. In order to use the host device consumption history, approval of the host device may be required.

Although a few examples of guest device actions were described in FIG. 15, the embodiments are not so limited. For example, another guest device action is upgrading a subscription. In this device action, the guest device may upgrade its subscription level to view any content shared by the host device, i.e., if the guest device does not have the required subscription to consume the content that is to be consumed.

Figure 16:
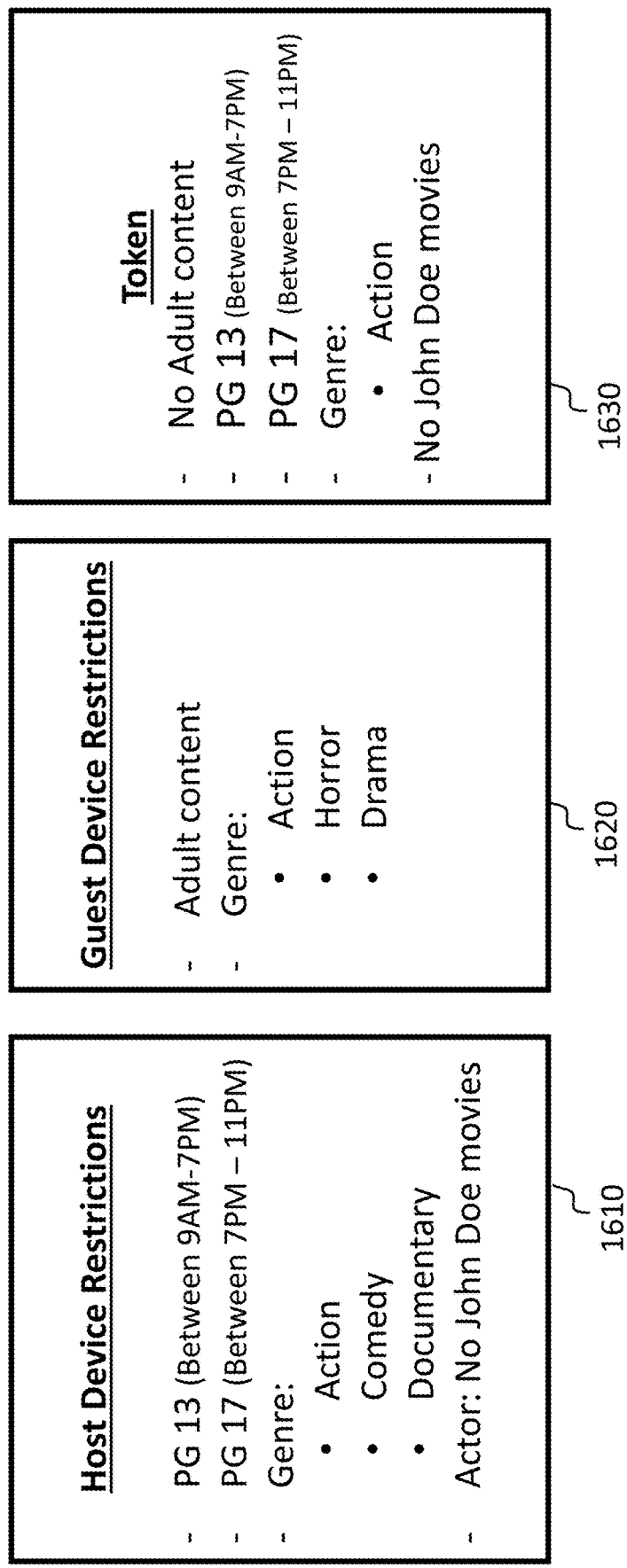
FIG. 16 is a block diagram of sharing and displaying restrictions related to the guest and host device, in accordance with some embodiments of the disclosure.

FIG. 16 is a block diagram of sharing and displaying restrictions related to the guest and host devices, in accordance with some embodiments of the disclosure.

Blocks 1610 and 1620 represent some examples of restrictions that the guest and host devices may store in their profiles. In some embodiments, the restrictions may also be automatically determined based on a pattern of prior restrictions. Block 1630 represents the control circuitry 220 and/or 228 combining both guest and host device restrictions and issuing a session token based on the combined restrictions. In some embodiments, the control circuitry 220 and/or 228 may also combine restrictions placed by the OTT service provider, such as the subscription lock mentioned above. The session token, in some embodiments, can be used by the host device to pull in the personalized media asset recommendations associated with the guest user and then display the recommendations on the display of the host device.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for displaying OTT media asset recommendations personalized for an OTT streaming account associated with a guest device on a host device comprising:
receiving a wireless communication at a server, wherein the wireless communication includes an indication of interest from a guest device to display media asset recommendations personalized for an OTT streaming account associated with the guest device on a display of a host device; and in response to the received indication of interest:

determining that the guest device and the host device are within a predetermined threshold distance of each other;

obtaining sharing restrictions associated with the OTT streaming account associated with the guest device, wherein the sharing restrictions are identified by one or more OTT profiles associated with an OTT application;

obtaining displaying restrictions associated with an OTT streaming account associated with the host device, wherein the displaying restrictions identify at least a type of media assets that are preferred for display on the host device when another device is sharing a media asset;

generating a token to establish a temporary session based on the guest and host device OTT streaming account restrictions for displaying the OTT media asset recommendations personalized for the OTT streaming account associated with the guest device on the display of the host device without having the guest device log in to the OTT streaming account associated with the guest device via the host device; and determining that a subset of media asset recommendations personalized for the OTT streaming account associated with the guest device are common with a subset of media asset recommendations personalized for the OTT streaming account associated with the host device.

2. The method of claim 1, wherein the OTT media asset recommendations personalized for the OTT streaming account associated with the guest device are determined based on consumption history of media assets consumed via the OTT streaming account associated with the guest device.

3. The method of claim 1, further comprising:

determining that the guest device and the host device are present on a same local area network (LAN); and receiving the indication of interest from the guest device to display media asset recommendations personalized for the OTT streaming account associated with the guest device on the display of the host device, wherein the indication of interest is a request to display the media asset recommendations personalized for the OTT streaming account associated with the guest device on the display of the host device.

4. The method of claim 1, wherein the indication of interest from the guest device received at the server is either a request or an approval to display the media asset recommendations personalized for the OTT streaming account associated with the guest device.

5. The method of claim 1, further comprising terminating the temporary session based on a determination that the guest device is no longer on a same LAN as the host device.

6. The method of claim, 1 further comprising:

receiving a request from the host device to continue the temporary session after the guest device is disconnected from a same LAN on which the host device is connected; and extending or denying extension of the temporary session based on the approval or disapproval received from the guest device.

7. The method of claim 1, further comprising:

capturing data relating to consumption of media assets during the temporary session; and using the captured data to recommend additional personalized media asset recommendations for either the host or the guest device, or both.

8. The method of claim 1, further comprising:

displaying the common media asset recommendations separately from other media asset recommendations personalized for the OTT streaming accounts associated with the host and guest devices.

9. The method of claim 1, further comprising displaying the common media asset recommendations in a higher order than media asset recommendations personalized for the OTT streaming accounts associated with the host and guest devices.

10. A method comprising:

receiving an indication of a guest device launching an OTT streaming application and logging in to an OTT streaming account that is associated with a user that is also associated with the guest device;

in response to the indication, performing a proximity search using a GPS signal to identify one or more host devices;

identifying at least one host device based on the proximity search;

filtering media asset recommendations personalized for the OTT streaming account associated with the guest device based on restrictions associated with the OTT streaming accounts associated with the guest device and the host device, wherein restrictions for the guest device are sharing restrictions identified by one or more OTT profiles associated with an OTT application, wherein restrictions for the host device are displaying restrictions to identify at least a type of media assets that are preferred for display on the host device when another device is sharing a media asset;

generating a token that includes restrictions for the OTT streaming accounts associated with the guest and host devices;

establishing a temporary session for displaying the OTT media asset recommendations personalized for the OTT streaming account associated with the guest device, based on the generated token, on a display of the host device without having the guest device log in to their OTT streaming account associated with the guest device via the host device; and detecting a pattern of the OTT streaming account associated with the guest device selecting certain media assets, from the OTT media asset recommendations personalized for the OTT streaming account associated with the guest device, for display on the host device.

11. The method of claim 10, further comprising:

receiving speech input within a predetermined distance from the host device;

analyzing the speech input to determine whether the content or context of the speech input relates to media assets that are available via an OTT streaming application that is associated with the OTT streaming account associated with guest device; and in response to determining that the content or context of the speech input relates to media assets that are available via the OTT streaming application:

identifying media assets that are related to the content or context of the speech input; and displaying the identified media assets that are related to the content or context of the speech input more prominently than other media asset recommendations.

12. The method of claim 10, further comprising:
in response to detecting the pattern, automatically selecting a subset of media asset recommendations personalized for the OTT streaming account associated with the guest device and displaying them on the host device.

13. The method of claim 10, wherein the display of the OTT media asset recommendations personalized for the OTT streaming account associated with the guest device on the host device is arranged in a filmstrip format.

14. A system for displaying OTT media asset recommendations personalized for an OTT streaming account associated with a guest device on a host device comprising:
communications circuitry configured to communicate with an OTT streaming server; and
control circuitry configured to:
receive a wireless communication that includes an indication of interest from a guest device to display media asset recommendations personalized for an OTT streaming account associated with the guest device on a display of a host device; and
in response to the received indication of interest:
determine that the guest device and the host device are within a predetermined threshold distance of each other;
obtain sharing restrictions associated with the OTT streaming account associated with the guest device, wherein the sharing restrictions are identified by one or more OTT profiles associated with an OTT application;
obtain displaying restrictions associated with an OTT streaming account associated with the host device, wherein the displaying restrictions identify at least a type of media assets that are preferred for display on the host device when another device is sharing a media asset; and
generate a token to establish a temporary session based on the guest and host device OTT streaming account restrictions for displaying the OTT media asset recommendations personalized for the OTT streaming account associated with the guest device on the display of the host device without having the guest device log in to the OTT streaming account associated with the guest device via the host device; and
determine that a subset of media asset recommendations personalized for the OTT streaming account associated with the guest device are common with a subset of media asset recommendations personalized for the OTT streaming account associated with the host device.

15. The system of claim 14, wherein the OTT media asset recommendations personalized for the OTT streaming account associated with the guest device are determined by the control circuitry based on consumption history of media assets consumed via the OTT streaming account associated with the guest device.

16. The system of claim 14, further comprising, the control circuitry configured to:
determine that the guest device and the host device are present on the same local area network (LAN); and
receive the indication of interest from the guest device to display media asset recommendations personalized for the OTT streaming account associated with the guest device on the display of the host device, wherein the indication of interest is a request to display the media asset recommendations personalized for the OTT streaming account associated with the guest device on the display of the host device.

17. The system of claim 14, wherein the indication of interest from the guest device is either a request or an approval to display the media asset recommendations personalized for the OTT streaming account associated with the guest device.

18. The system of claim 14, further comprising, the control circuitry configured to terminate the temporary session based on a determination that the guest device is no longer on the same LAN as the host device.

* * * * *